(12) United States Patent
Pechersky

(10) Patent No.: US 12,045,368 B2
(45) Date of Patent: Jul. 23, 2024

(54) PRIVACY-PRESERVING DATA COLLECTING

(71) Applicant: ANAGOG LTD., Tel Aviv (IL)

(72) Inventor: Igor Pechersky, Karney Shomron (IL)

(73) Assignee: ANAGOG LTD., Tel Aviv (IL)

( * ) Notice: Subject to any disclaimer, the term of this patent is extended or adjusted under 35 U.S.C. 154(b) by 401 days.

(21) Appl. No.: 17/464,322

(22) Filed: Sep. 1, 2021

(65) Prior Publication Data

US 2021/0397744 A1 Dec. 23, 2021

Related U.S. Application Data

(63) Continuation of application No. PCT/IL2020/050267, filed on Mar. 8, 2020.

(60) Provisional application No. 62/815,573, filed on Mar. 8, 2019.

(51) Int. Cl.
*H04L 29/06* (2006.01)
*G06F 21/62* (2013.01)

(52) U.S. Cl.
CPC .................. *G06F 21/6245* (2013.01)

(58) Field of Classification Search
CPC .................................... G06F 21/6245
See application file for complete search history.

(56) References Cited

U.S. PATENT DOCUMENTS

| | | | |
|---|---|---|---|
| 8,619,194 B1 | 12/2013 | Franji | |
| 2001/0014911 A1 | 8/2001 | Doi et al. | |
| 2013/0179513 A1* | 7/2013 | Furukawa | H04L 67/535 709/204 |
| 2014/0215635 A1 | 7/2014 | Neuenschwander et al. | |
| 2016/0004881 A1 | 1/2016 | Sukeda et al. | |
| 2017/0201879 A1* | 7/2017 | Vlasenko | H04L 69/28 |
| 2017/0243417 A1* | 8/2017 | Manikantan Shila | H04W 12/06 |
| 2018/0350230 A1* | 12/2018 | Kienitz | G08G 1/0116 |
| 2021/0289353 A1* | 9/2021 | You | H04W 12/069 |

FOREIGN PATENT DOCUMENTS

WO 2018211303 A1 11/2018

OTHER PUBLICATIONS

European Search Report issued for International Patent Application No. 20769158.5, dated Nov. 21, 2022.

(Continued)

*Primary Examiner* — Evans Desrosiers
(74) *Attorney, Agent, or Firm* — Myers Wolin, LLC

(57) ABSTRACT

A method, system and product including communicating a first report associated with a first temporary identifier of a user device; upon receiving the first report from the user device, storing the first report with the first temporary identifier; communicating a message comprising a second temporary identifier of the user device; communicating a second report that is associated with the second temporary identifier of the user device, wherein the second report is not associated with the first temporary identifier; upon receiving from the user device a second report, storing the second report with the second temporary identifier, whereby the first report cannot be directly matched with the second report based on respective identifiers thereof.

20 Claims, 7 Drawing Sheets

(56) References Cited

OTHER PUBLICATIONS

Chen et al. "Participant Density-Independent Location Privacy Protection for Data Aggregation in Mobile Crowd-Sensing", Sep. 5, 2017, pp. 699-723, vol. 98, No. 1, Springer Science+Business Media, LLC.
Ni et al. "Security, Privacy, and Fairness in Fog-Based Vehicular Crowdsensing", IEEE Communications Magazine, Jun. 2017, pp. 146-152, vol. 55, No. 6.
International Search Report issued for corresponding International Patent Application No. PCT/IL2020/050267 dated May 26, 2020.
Konidala et al., "Anonymous authentication of visitors for mobile crowd sensing at amusement parks," Information Security Practice and Experience: 9th International Conference, ISPEC 2013, Lanzhou, China, May 12-14: Proceedings: 7863, pp. 174-188, Research Collection School of Information Systems, May 30, 2013, URL:<https://ink.library.smu.edu.sg/sis_research/1946>.

* cited by examiner

PRIVACY-PRESERVING DATA COLLECTING

CROSS-REFERENCE TO RELATED APPLICATION

This application is a continuation of International PCT application No. PCT/IL2020/050267 entitled, "Privacy-Preserving Data Collecting," filed Mar. 8, 2020, which claims benefit of provisional U.S. patent application No. 62/815,573 entitled, "Privacy-Preserving Data Crowd-Sensing," filed Mar. 8, 2019, which is hereby incorporated by reference in its entirety without giving rise to disavowment.

TECHNICAL FIELD

The present disclosure relates to accumulating sensitive information in general, and to systems, products, and methods for accumulating sensitive information while preserving user privacy, in particular.

BACKGROUND

Crowdsensing is a model in which data is obtained from a large, relatively open and often rapidly-evolving group of users. Crowdsensing may divide work between participants to achieve a cumulative result. In some cases, the crowdsensing users may utilize devices capable of sensing and computing, to collectively share data and extract information to measure, map, analyze, estimate or infer any processes of common interest.

As an example, WAZE™ by GOOGLE™ is a platform which utilizes the crowdsensing model to determine traffic information. A dedicated application is installed on end-user devices that participate in the creation of data. Each end-user device utilizes its Global Positioning System (GPS) sensor to determine location and speed information, which is in turn provided to a central server. At the central server, all collected information is aggregated to determine average speed in different roads, indicating traffic congestion at different times. Based on such information, each end-user device can be provided with up-to-date navigation instructions taking into account the current state of the traffic.

BRIEF SUMMARY

One exemplary embodiment of the disclosed subject matter is a method comprising: obtaining first sensitive information from one or more sensors of a user device, wherein the first sensitive information comprises information that is sensitive for a user of the user device, wherein the user device is temporarily identified by a first temporary identifier; sending a first report of the first sensitive information to the server, wherein the first report is associated with the first temporary identifier of the user device; after sending the first report, communicating a message between the user device and the server, wherein the message comprises a second temporary identifier of the user device; obtaining second sensitive information from the one or more sensors of the user device; and sending a second report of the second sensitive information to the server, wherein the second report is associated with the second temporary identifier of the user device, wherein the second report is not associated with the first temporary identifier, whereby a first analysis of user behavior associated with the first temporary identifier is enabled, and a second analysis of user behavior associated with the second temporary identifier is enabled, while the first and second analyses are not determined to be associated with a same user.

Optionally, the method comprises generating the first temporary identifier at the user device and transmitting a second message from the user device to the server, wherein the second message comprises a request to assign the first temporary identifier to the user device for a first period of time.

Optionally, generating the first temporary identifier comprises generating a first random value, wherein the second temporary identifier is generated by generating a second random value.

Optionally, the method comprises identifying an expiration event of the first temporary identifier based on at least one of: a defined time length after which each time period is to be terminated, a defined time length after which the first temporary identifier is to be terminated, a number of reports using the first temporary identifier that were sent to the server, and a direct instruction from the user of the user device to switch the first temporary identifier, wherein said communicating the message is performed in response to the expiration event.

Optionally, the method comprises receiving the first temporary identifier from the server via a second message prior to said sending the first report, and generating the first report to include an indication of the first temporary identifier.

Optionally, the message comprises an indication that the first temporary identifier is to be replaced with the second temporary identifier.

Optionally, the first sensitive information comprises location information obtained from the one or more sensors of the user device at a first location, and the second sensitive information comprises location information obtained from the one or more sensors of the user device at a second location.

Another exemplary embodiment of the disclosed subject matter is computer program product comprising a non-transitory computer readable storage medium retaining program instructions, which program instructions when read by a processor, cause the processor to perform: obtaining first sensitive information from one or more sensors of a user device, wherein the first sensitive information comprises information that is sensitive for a user of the user device, wherein the user device is temporarily identified by a first temporary identifier; sending a first report of the first sensitive information to the server, wherein the first report is associated with the first temporary identifier of the user device; after sending the first report, communicating a message between the user device and the server, wherein the message comprises a second temporary identifier of the user device; obtaining second sensitive information from the one or more sensors of the user device; and sending a second report of the second sensitive information to the server, wherein the second report is associated with the second temporary identifier of the user device, wherein the second report is not associated with the first temporary identifier, whereby a first analysis of user behavior associated with the first temporary identifier is enabled, and a second analysis of user behavior associated with the second temporary identifier is enabled, while the first and second analyses are not determined to be associated with a same user.

Yet another exemplary embodiment of the disclosed subject matter is a system, the system comprising a processor and coupled memory, the processor being adapted to perform: obtaining first sensitive information from one or more sensors of a user device, wherein the first sensitive information comprises information that is sensitive for a user of the user device, wherein the user device is temporarily identified by a first temporary identifier; sending a first report of the first sensitive information to the server, wherein the first report is associated with the first temporary identifier of the user device; after sending the first report, communicating a message between the user device and the server, wherein the message comprises a second temporary identifier of the user device; obtaining second sensitive information from the one or more sensors of the user device; and sending a second report of the second sensitive information to the server, wherein the second report is associated with the second temporary identifier of the user device, wherein the second report is not associated with the first temporary identifier, whereby a first analysis of user behavior associated with the first temporary identifier is enabled, and a second analysis of user behavior associated with the second temporary identifier is enabled, while the first and second analyses are not determined to be associated with a same user.

Yet another exemplary embodiment of the disclosed subject matter is a method comprising: upon receiving a first report of sensitive information associated with a first temporary identifier, storing the first report with the first temporary identifier, wherein the first temporary identifier is utilized to temporarily identify a user device; after receiving the first report, communicating a message between the user device and the server, wherein the message comprises the first temporary identifier and a second temporary identifier of the user device; upon receiving from the user device a second report of sensitive information associated with the second temporary identifier, storing the second report with the second temporary identifier, whereby the first report cannot be directly matched with the second report based on respective identifiers thereof; and analyzing stored reports, wherein said analyzing comprises performing an analysis of user behavior based on retained reports, wherein the analysis of user behavior concludes a first user behavior associated with the first temporary identifier and a second user behavior associated with the second temporary identifier, whereby potentially determining different user behavior for a same user.

Optionally, the analysis of user behavior differentiates reports associated with the first temporary identifier from reports associated with the second temporary identifier in a same manner that the analysis of user behavior differentiates reports associated with the first temporary identifier from reports associated with a third temporary identifier, wherein the third temporary identifier is an identifier of a second user device different than the user device.

Optionally, the method comprises, upon assigning the first temporary identifier to identify the first user device, adding the first temporary identifier to a list of active temporary identifiers, wherein said communicating the message comprises modifying the list of active temporary identifiers based on identifying that the second temporary identifier is not located in the list of active temporary identifiers of the server, wherein said modifying comprises adding the second temporary identifier to the list of active temporary identifiers and removing the first temporary identifier from the list of active temporary identifiers.

Optionally, the method comprises tracking malicious activity by determining that the first temporary identifier is associated with malicious activity based on reports associated with the first temporary identifier, and marking the first temporary identifier as malicious, wherein modifying the list of active temporary identifiers comprises marking the second temporary identifier as malicious.

Optionally, the method comprises modifying the list of active temporary identifiers periodically, or upon reaching a maximal threshold of requests to replace temporary identifiers.

Optionally, the first temporary identifier is determined to be associated with malicious activity based on at least one of: contradictory information in reports associated with the first temporary identifier; an abnormal quantity of reports associated with the first temporary identifier within a timeframe; and an inconsistency of reports associated with the first temporary identifier.

Optionally, the analysis of user behavior comprises a reliability analysis, wherein the reliability analysis is configured to determine a reliability score for the first temporary identifier based on reports associated with the first temporary identifier, wherein in response to determining that a reliability score of the first temporary identifier is below a threshold, marking the first temporary identifier with an unreliability indication in the list of active temporary identifiers.

Optionally, the method comprises assigning to each report associated with the first temporary identifier the unreliability indication, wherein said assigning is performed prior to said communicating the message between the user device and the server.

Optionally, the method comprises receiving a plurality of messages from a respective plurality of user devices, wherein each message of the plurality of messages comprises a request to change a temporary identifier of the respective user device, wherein the method comprises inserting the plurality of messages in a queue and processing them at an end of a defined period.

Another exemplary embodiment of the disclosed subject matter is computer program product comprising a non-transitory computer readable storage medium retaining program instructions, which program instructions when read by a processor, cause the processor to perform: upon receiving a first report of sensitive information associated with a first temporary identifier, storing the first report with the first temporary identifier, wherein the first temporary identifier is utilized to temporarily identify a user device; after receiving the first report, communicating a message between the user device and the server, wherein the message comprises the first temporary identifier and a second temporary identifier of the user device; upon receiving from the user device a second report of sensitive information associated with the second temporary identifier, storing the second report with the second temporary identifier, whereby the first report cannot be directly matched with the second report based on respective identifiers thereof; and analyzing stored reports, wherein said analyzing comprises performing an analysis of user behavior based on retained reports, wherein the analysis of user behavior concludes a first user behavior associated with the first temporary identifier and a second user behavior associated with the second temporary identifier, whereby potentially determining different user behavior for a same user.

Yet another exemplary embodiment of the disclosed subject matter is a system, the system comprising a processor and coupled memory, the processor being adapted to perform: upon receiving a first report of sensitive information associated with a first temporary identifier, storing the first report with the first temporary identifier, wherein the first temporary identifier is utilized to temporarily identify a user device; after receiving the first report, communicating a message between the user device and the server, wherein the message comprises the first temporary identifier and a second temporary identifier of the user device; upon receiving from the user device a second report of sensitive information associated with the second temporary identifier, storing the second report with the second temporary identifier, whereby the first report cannot be directly matched with the second report based on respective identifiers thereof; and analyzing stored reports, wherein said analyzing comprises performing an analysis of user behavior based on retained reports, wherein the analysis of user behavior concludes a first user behavior associated with the first temporary identifier and a second user behavior associated with the second temporary identifier, whereby potentially determining different user behavior for a same user.

Yet another exemplary embodiment of the disclosed subject matter is a system comprising: a server coupled to a database, wherein the database retaining reports of sensitive information, wherein each report is associated with an identifier of a source of the report; a plurality of user devices configured to transmit reports of sensitive information to the server, wherein each device of the plurality of user devices is uniquely identified at each point in time using a temporary identifier, wherein each device of the plurality of user devices is identified by at least two different temporary identifiers at two different timeframes; and wherein the system is configured to preserve privacy of users of the plurality of user devices by preventing ability to group all sensitive information of a user device over time, while enabling grouping of reports originating from the same user device over time.

Optionally, the server is configured to retain a list of active temporary identifiers, and to enable a replacement of a first temporary identifier of a user device by a second temporary identifier, wherein said server is configured to avoid retaining information connecting between the first temporary identifier and the second temporary identifier, whereby preventing ability to group sensitive information associated with the first temporary identifier with sensitive information associated with the second temporary identifier.

Optionally, each temporary identifier in the list of active temporary identifiers is matched with a permanent identifier of the user device, wherein the server is configured to avoid retaining permanent identifiers matching temporary identifiers that are excluded from the list of active temporary identifiers, whereby preventing analysis of a history of a specific user based on a permanent identifier thereof.

Optionally, the server is configured to determine a score of each user device based on reports received therefrom and associated with a same temporary identifier.

Optionally, upon replacing a first temporary identifier by a second temporary identifier, the score of the first temporary identifier is assigned to be the score of the second temporary identifier

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
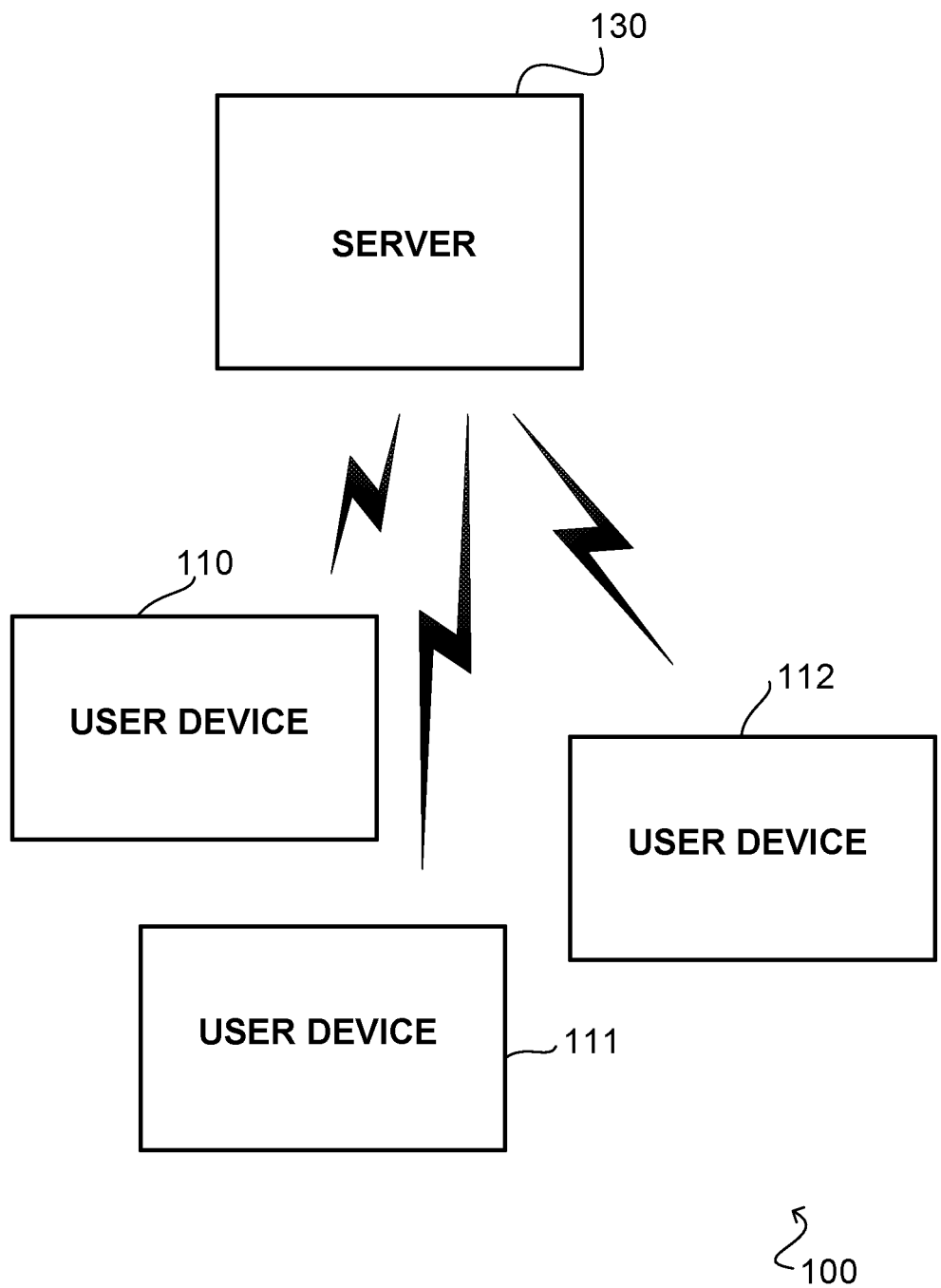
FIG. 1 illustrates a schematic illustration of an exemplary environment and architecture in which the disclosed subject matter may be utilized, in accordance with some exemplary embodiments of the disclosed subject matter.

One technical problem dealt with by the disclosed subject matter is accumulating sensitive information from user devices, e.g., via mobile crowdsensing, without linking the sensitive information to the users. In some exemplary embodiments, it may be desired to enable privacy preserving mobile crowdsensing, for example, in a manner that does not enable to track or uniquely identify users operating the user devices.

In some exemplary embodiments, as part of the crowdsensing model, potentially sensitive information may be provided to the central server for analysis. Such information may comprise Personally Identifiable Information (PII), such as the home location of the end-user, along with sensitive information, such as the user's comings and goings. It may be desired to protect the privacy of the users, to allow them to participate in the crowdsensing task without having to sacrifice their privacy. It is also noted that protecting privacy of users, as well as the manner of processing personal information, may be governed by different rules and regulations such as the European Union (EU) General Data Protection Regulation (GDPR). In some exemplary embodiments, entities such as advertising parties may desire to obtain sensitive information from user devices and retain them at a server, e.g., while complying with privacy requirements.

Another technical problem dealt with by the disclosed subject matter is to retain at a server sensitive information from users of user devices in a manner that ensures that the data cannot be used to violate the privacy of the users. In some cases, servers may be hacked, e.g., by malicious actors, thus exposing and providing access to sensitive data retained at the servers. In some cases, servers may provide access to their data to third parties such as advertising parties, or may be operated by third parties. In some exemplary embodiments, it may be desired that even when sensitive information from user devices is exposed to third parties, such sensitive information may not be used to uniquely identify a user, e.g., by identifying which sensitive information belongs to which user device.

Yet another technical problem dealt with by the disclosed subject matter is eliminating and minimizing an effect of adversarial attacks that may attempt to corrupt sensitive information that may be retained in a privacy preserving manner, e.g., without permanent identifiers (IDs). In some exemplary embodiments, in order to ensure that clients cannot be uniquely identified, sensitive information obtained from the user devices may not be retained with a permanent identifier of the user devices. However, eliminating a use of identifiers whatsoever may cause the data to be vulnerable to a plurality of simple attacks and exploitations. In some exemplary embodiments, obtaining sensitive information without identifiers is primarily based on trust, making it difficult to track activities of adversaries attempting to game the system and provide false information.

In some exemplary embodiments, initial generation or aggregation of sensitive information may be performed at each user device, and then reported via crowdsensing methods to a server. In some exemplary embodiments, the server may store the crowd-sensed data without permanent user identifiers which may be linked to PII of the users, and thus violate user privacy. However, the crowd-sensed data stored by the server may be susceptible to simple adversarial attack, for example, since identifiers of the user devices are required for verifying and controlling the crowdsensing process so that identities of malicious senders may be identified and blocked or handled in any other way.

As an example, an adversary may send large amounts of poisoned or corrupted data, such as data containing substantially wrong locations, or data containing multiple different locations for a same access point, data containing multiple locations of a user at the same time or at substantially adjacent time points, or the like. In some exemplary embodiments, since the server may not verify identities or identifiers of senders, the identity of the malicious sender will not be examined or identified. In some exemplary embodiments, malicious data from malicious senders may be assigned with a same weight as any legitimate data, and eventually may cause significant errors in resulting analyses of the sensitive information. As an example, advertising parties that determine an advertising parameter for user profiles based on poisoned data, may obtain an inefficient and bad quality advertising (e.g., resulting with a low clickthrough rate (CTR)). As another example, denial-of-service (DoS) attacks may be utilized by attackers to disrupt the system. As yet another example, a malicious user may provide erroneous location information to a WAZE™ system, to cause the system to indicate traffic jams in empty roads, such as by sending a plurality of reports of vehicles driving slowly in the empty road, in a pattern matching a traffic jam. Without the ability to identify that all the reports are associated with the same user (or group of users), WAZE™ cannot identify that these reports are fake.

Yet another technical problem dealt with by the disclosed subject matter is analyzing behavioral patterns of users based on accumulated sensitive information that is not linked to permanent identifiers of users. In some exemplary embodiments, it may be desired to create advertising profiles, to determine advertising parameters, to determine traffic parameters, or the like, without being able to uniquely identify the users from which the sensitive information is obtained, and while ensuring enough context and data connections are maintained to make the data useful for third parties.

In some exemplary embodiments, mobile crowdsensing methods may provide mobile data, e.g., sensitive or non-sensitive information, obtained from user devices (also referred to as "clients"). In some exemplary embodiments, sensitive information may include geolocation data, acceleration patterns, connectivity data, sensor-based data, or the like. In some exemplary embodiments, sensitive information may include data that, in large quantities, can be used to track activities, activity patterns, PII, or to obtain any private or personal information of users which may be sensitive to the user, which may be used to uniquely identify the user, or the like. In some exemplary embodiments, sensitive information may comprise any type of user data that is continuously monitored, periodically monitored, monitored based on instructions, monitored based on detecting real time events, or the like.

As an example, sensitive information may include geolocation data received from satellite-based sensors such as from a Global Navigation Satellite System (GNSS) receiver of a user device, or from non-satellite based positioning modules which may be embedded in the user device. As another example, sensitive information may include connectivity information, e.g., Received Signal Strength Indicator (RSSI) indications, which may indicate a connectivity level of user devices to connectivity providers such as Wi-Fi access points, hotspots, cellular towers, or the like. In some exemplary embodiments, a connection strength to the connectivity providers, a Round Trip Time (RTT) time to the connectivity providers, or the like, may be utilized to determine a location of a user of the user device over a time frame, e.g., even when a reception of satellite-based signals is blocked. As another example, sensitive information may include data obtained from sensors such as accelerometers and gyroscopes of the user device, e.g., which may indicate a speed, an orientation, a direction, or the like, of the user devices. As another example, sensitive information may include network-based data such as browsing history, purchase history, dialed numbers, chat history, or the like. In some cases, such information may be utilized, in large quantities, to identify activity patterns of users, such as driving times, walking times, working times, working places, shopping habits, or the like.

In some exemplary embodiments, crowd-sensed information may be retained in a database (DB) and utilized for a plurality of applications, such as geolocation, advertising, or the like. In some cases, a fingerprint of connectivity to connectivity providers such as stationary Wi-Fi access points may be determined for each client and retained in a database, e.g., to enable continuous determination of the geolocation of mobile clients. In some cases, a database of connectivity fingerprints to connectivity providers may be built and continuously maintained based on aggregated crowd-sensed data from mobile devices. The crowd-sensed data may comprise reports of visible connectivity providers such as hotspots, access points that may be identified by their Basic Service Set Identifiers (BSSIDs), Service Set Identifiers (SSIDs), or the like. Additionally or alternatively, the crowd-sensed data may comprise, for each connectivity provider, the perceived Received Signal Strength Indicator (RSSI) level, timestamps, recorded location of the device during the Wi-Fi scan, or the like.

In some exemplary embodiments, it may be desired to provide a system that balances between safety and privacy requirements on the one hand, and is useful for advertising, navigation, or any other third party applications, on the other hand.

One technical solution is to utilize temporary, brief, ephemeral, non-permanent, or the like, identifiers for identifying one or more clients for a limited period of time. In some exemplary embodiments, an initial temporary identifier may be generated for a client to be used during an initial time period, and a request to assign the initial temporary identifier to the client may be provided to a server. In some exemplary embodiments, when the initial time period expires, the initial temporary identifier may be replaced, e.g., iteratively, with new temporary identifiers during subsequent time periods. In some exemplary embodiments, temporary identifiers may be generated independently on client devices, at the server, at any other computing device, by a human operator, or the like. In some exemplary embodiments, temporary identifiers may be generated to include a string, number, or value that is long enough to prevent or reduce likelihood of any collision. In some exemplary embodiments, temporary identifiers may be generated randomly, according to heuristics, a combination thereof, or the like.

In some exemplary embodiments, a server may assign a plurality of temporary identifiers to a plurality of respective clients, e.g., based on requests from the clients, based on configurations of the server, based on instructions from third party devices, or the like. In some exemplary embodiments, during a period of time, the server may receive a plurality of messages from a respective plurality of clients. In some exemplary embodiments, each message may comprise a request to assign a temporary identifier to the respective client, with or without a proposed temporary identifier. In some exemplary embodiments, the server may insert the plurality of messages in a queue and process them at an end of the period of time. In some exemplary embodiments, the server may process the plurality of messages upon arrival, upon identifying an event, based on heuristics, or the like.

In some exemplary embodiments, prior to assigning the temporary identifiers, the server may validate the temporary identifiers and identify whether they have a valid format, a valid value, a valid length, or the like. In some exemplary embodiments, prior to assigning a temporary identifier to a client, the server may verify that a requested or generated temporary identifier is not listed in a list of active temporary identifiers retained by the server. In some exemplary embodiments, in case that the requested or generated temporary identifier is present in the list of active temporary identifiers, the requested or generated temporary identifier may be rejected and may not be assigned to the client.

In some exemplary embodiments, upon assigning a temporary identifier to a client, the server may keep, e.g., in a temporary manner, an indication that the temporary identifier is associated with the client to which it was assigned. For example, such an indication may indicate an association between a Media Access Control (MAC) address of a client and its assigned temporary identifier. In some exemplary embodiments, upon replacing the temporary identifier with a new temporary identifier, the MAC address of the client may be indicated to be associated with the new temporary identifier instead of the previous temporary identifier. In some exemplary embodiments, the server may avoid keeping any information regarding the past associations of the same MAC address with different temporary identifiers in past time durations.

In some exemplary embodiments, user devices that were assigned temporary identifiers may provide data such as sensitive information, non-sensitive information, or any other sensor-based data to the server using their temporary identifiers. In some exemplary embodiments, the sensitive information may comprise information that is sensitive for a user of the user device, e.g., data that, in large quantities, can be used to uniquely identify the user, to track activities or locations of the user, to identify activity patterns, to detect PII data of the user, or the like. In some exemplary embodiments, the user devices may provide the sensitive information together with associated temporary identifiers to the server via one or more reports, messages, indications, or the like. In some exemplary embodiments, a report of sensitive information may comprise aggregated, processed, accumulated, or the like, sensor information, which may be aggregated, processed, accumulated, or the like, at the client side to create a report.

In some exemplary embodiments, the server may retain a database of reports, wherein each entry of the database may include a report of sensitive information, an associated temporary identifier, a score of the report, or the like. In some exemplary embodiments, the data may be validated prior to being retained by the server, e.g., in a reports database, to ensure that the sensitive information is provided during a valid timeframe, that the temporary identifiers are valid, that an address of a client matches the utilized temporary identifier, or the like.

In some exemplary embodiments, any modification and replacement of temporary identifiers may be performed by replacing temporary identifiers in the list of active temporary identifiers by the server. It may be appreciated that each client may be associated with only one active temporary identifier at a time. In some exemplary embodiments, each client may be uniquely identified at each point in time using a temporary identifier. In some exemplary embodiments, each client may be identified by at least two different temporary identifiers at two different timeframes. In some exemplary embodiments, the server may be responsible to ensure that no more than one temporary identifier is present in the list for each client in any given moment.

In some exemplary embodiments, a client that wishes to be assigned an initial temporary identifier, may communicate an initial message (also referred to as a "creation message") with the server. In some exemplary embodiments, creation messages may comprise an initial request to assign a temporary identifier to a user device of the client. In some cases, creation messages may be generated by clients. In some cases, creation messages may be generated by servers in response to client requests, configurations, third party instructions, or the like. In some exemplary embodiments, creation messages may comprise an initial temporary identifier, a period of time during which the initial temporary identifier is valid, an expiration date or event of the initial temporary identifier, a protocol for replacing the initial temporary identifier, an address of the user device, or the like. In some exemplary embodiments, a protocol for replacing a temporary identifier may indicate whether or not the temporary identifier is to be generated automatically by the server or the client, whether or not the temporary identifier is to be requested for periodically by clients, a maximal number of sensitive information reports per session, a defined active period of the temporary identifier, whether or not an acknowledgement is required, a manner in which request can be declined, or the like.

In some exemplary embodiments, after being assigned with an initial temporary identifier, temporary identifiers may be replaced, e.g., periodically, upon request, or the like. In some exemplary embodiments, temporary identifiers may be periodically changed according to one or more defined time lengths, one or more thresholds, or the like. In some exemplary embodiments, a temporary identifier may be replaced upon identifying an expiration event of the temporary identifier such as an end of a defined period for the temporary identifier, a number of reports that use the temporary identifier exceeding a threshold, or the like. In some exemplary embodiments, temporary identifiers may be valid during determined time lengths which may be defined for corresponding time periods, e.g., which may or may not be equal to one another. In some exemplary embodiments, time lengths of time periods may indicate that each time period is to be terminated after the time length has expired. In some exemplary embodiments, an expiration event of temporary identifiers may include reaching a defined threshold such as a maximal number of communications, e.g., of reports, messages, or the like. In some exemplary embodiments, an expiration event of temporary identifiers may include receiving an instruction, e.g., from the user, instructing to replace a temporary identifier.

In some exemplary embodiments, when a time period ends, a temporary identifier that was assigned for the time period may not be active. In some exemplary embodiments, in order to use temporary identifiers after an assigned period has expired, an original temporary identifier may be required to be replaced with a new temporary identifier. In some exemplary embodiments, temporary identifiers may be frequently re-created, such as once per hour, once per 12 hours, once per a day, once per week, or the like, e.g., so that users may not be uniquely identified, on the one hand, while allowing for a manner of reviewing activities of the same user over time, to identify behavioral patterns.

In some cases, clients may generate their own temporary identifiers independently, and provide them to the server. In some exemplary embodiments, clients may send to the server a request to replace a temporary identifier (also referred to as a "re-creation message"), e.g., via a message which may contain in one or more fields the old and the new temporary identifiers.

In some cases, servers may generate temporary identifiers for clients, and provide them to the clients to be used in future messages. In some exemplary embodiments, re-creation or creation messages may be generated by the server and provided to corresponding clients, e.g., based on client requests, periodically, upon identifying certain events, based on identifying that an assigned time period has nearly expired or has already expired, or the like. In some exemplary embodiments, the server may be configured to replace temporary identifiers by excluding the old temporary identifier from the list of active temporary identifiers retained by the server, and inserting a new temporary identifier thereto.

In some exemplary embodiments, after clients are assigned with a temporary identifier, they may obtain and aggregate sensor information and generate sensitive information reports based thereon. In some exemplary embodiments, sensitive information reports may contain currently assigned temporary identifiers of the sending clients, and may be provided to the server. In some exemplary embodiments, any report with unknown temporary identifier, such as an identifier not included in the list of active temporary identifiers, may be discarded. In some exemplary embodiments, the list of active temporary identifiers may be modified periodically, upon reaching a maximal threshold of requests to assign temporary identifiers, based on one or more instructions, based on one or more request such as creation or re-creation messages, or the like.

In some exemplary embodiments, temporary identifiers may be determined to be associated with malicious activity based on analyses of client reports. In some exemplary embodiments, malicious activity may be determined when identifying contradictory sensitive information associated with a temporary identifier, an abnormal quantity of sensitive information in an associated report, an abnormal quantity of reports associated with the temporary identifier within a timeframe, corrupt or contradictory information from a same temporary identifier, an inconsistency of reports associated with the temporary identifier, or the like. In some exemplary embodiments, in addition to a temporary identifier, a client may be identified as potentially malicious, unreliable, or the like, upon receiving a report of sensitive information associated with a temporary identifier from the client, when the temporary identifier was assigned to a different client, was not assigned at all, or the like.

In some exemplary embodiments, the server may track malicious activity by marking identifiers as potentially malicious, unreliable, or the like, and passing on the mark to subsequent identifiers replacing the marked identifier. In some exemplary embodiments, a mark may merely indicate that the marked identifier is potentially malicious, or may indicate more detailed information, e.g., indicating a specific score such as between 1 and 10, between 0 and 1, or the like, indicating how malicious, how dangerous, how unreliable, or the like, the identifier may be considered to be. In some exemplary embodiments, an identifier may be marked with a reliability score, e.g., which may be determined based on heuristics, user rules, classifiers, or the like. In some exemplary embodiments, upon determining that a reliability score of a temporary identifier is below a threshold, the temporary identifier may be marked with or without the low reliability score in the list of active temporary identifiers.

In some exemplary embodiments, a throttle algorithm may be applied to reports with a same temporary identifier. As an example, lower weights may be assigned to reports sent too frequently from a single client, to several reports from different clients with the same temporary identifier, to several contradictory reports from the same client or temporary identifier, or the like. As result, overwhelming the server with skewed data may be prevented, while excluding a possibility to track the client's history. Other algorithms may be utilized to identify potential malicious activity or skewed data, and attribute low weights to such data.

In some exemplary embodiments, the server may analyze stored reports, or provide access to the stored reports to analyzing parties. In some exemplary embodiments, stored reports may be analyzed according to their associated temporary identifiers, such that reports obtained from a same client when utilizing a first temporary identifier may be analyzed separately from reports obtained from the same client when utilizing a second temporary identifier. In some exemplary embodiments, the server may not suggest that any association, e.g., of a user's identity, exists between reports retained with different temporary identifiers. In some exemplary embodiments, one or more behavioral patterns and statistical results that may be useful for advertising, navigation, or the like, may be determined for each temporary identifier, e.g., separately, thus enabling to define one or more advertising parameters, navigation parameters, advertising profiles, or the like, based on analysis of reports from each temporary identifier.

One technical effect of utilizing the disclosed subject matter is accumulating sensitive information from user devices, e.g., via mobile crowdsensing, and retaining the sensitive information without linking the sensitive information to the users. In some exemplary embodiments, crowdsensed information may be accumulated from users and preserved in a manner that ensures that the data cannot be used to violate the privacy of the users. In some exemplary embodiments, utilizing the disclosed subject matter may ensure that third parties gaining access to a database of sensitive information from user devices will not be able to link meaningful sensitive information to a specific user device, e.g., which may violate the privacy of the user device. Specifically, even when sensitive information from user devices is exposed to third parties, such sensitive information may not be used to uniquely identify a user, e.g., by identifying which sensitive information belongs to which user device. In some exemplary embodiments, the disclosed subject matter may allow any client to force seamlessly the accelerated forgetfulness of the server. Any re-creation of temporary identifiers may effectively cleave any link between the given client and the track of its last activities.

Another technical effect of utilizing the disclosed subject matter is eliminating and minimizing an effect of adversarial attacks that attempt to corrupt sensitive information that is retained in a privacy preserving manner, e.g., without permanent identifiers. In some exemplary embodiments, providing temporary identifiers enables to both track adversaries and handle and utilize the data in a meaningful safe way.

Yet another technical effect of utilizing the disclosed subject matter is enabling to analyze behavior patterns of users based on accumulated sensitive information that is not linked to permanent identifiers of users. Specifically, user profiles, user parameters, or the like may be created based on sensitive information obtained from user devices, e.g., without retaining user identifiers that can be used able to uniquely identify the users.

Yet another technical effect of utilizing the disclosed subject matter is complying with strict privacy requirements. Specifically, a profile of a temporary identifier may be generated without creating a centralized database of trackable personal information of users. In some cases, although user profiles that are generated based on sensitive information may be shared with third-party stakeholders, the user profiles may not be associated to any specific user, user history, or the like.

The disclosed subject matter may provide for one or more technical improvements over any pre-existing technique and any technique that has previously become routine or conventional in the art. Additional technical problems, solutions, and effects may be apparent to a person of ordinary skill in the art in view of the present disclosure.

Referring now to FIG. 1, which illustrates a schematic illustration of an exemplary environment and architecture in which the disclosed subject matter may be utilized, in accordance with some exemplary embodiments of the disclosed subject matter.

In some exemplary embodiments, Environment 100 may comprise a plurality of User Devices 110-112. User Devices 110-112 may include Smartphones, Tablets, Augmented Reality (AR) devices, wearable devices, mobile devices, smartwatches, Personal Computers (PCs), a combination thereof, or the like. Each of User Devices 110-112 may comprise an Operating System (OS), a processor, a receiver, a transmitter, a memory, a network interface, built-in sensors, or the like. User Devices 110-112 may be used and carried by human users.

In some exemplary embodiments, Environment 100 may comprise a Server 130. Server 130 may be a remote server, a cloud server, a DNS, a GW server, a VPN server, or the like. In some exemplary embodiments, Server 130 may retain a list of presently active temporary identifiers (not shown) and a reports database (not shown) to retain reports of sensitive information. In some exemplary embodiments, Server 130 may be responsible to ensure that no more than one temporary identifier is present in the list for each client, e.g., User Devices 110-112, in any given moment.

Additionally or alternatively, Server 130 may be configured to verify that the temporary identifiers are unique in each time point. As an example, User Device 110 and User Device 112 may not utilize the same identifier at the same time. However, User Device 110 and User Device 112 may use the same temporary identifier in different time frames, such as User Device 110 may use the identifier at a first timeframe when User Device 112 is not using the same identifier, and after User Device 110 releases the temporary identifier, e.g., when the temporary identifier expires, it may be re-used as an identifier of User Device 112.

In some exemplary embodiments, upon obtaining a request from User Device 110 to assign a first temporary identifier to User Device 110, Server 130 may be configured to examine a list of presently active temporary identifiers and determine whether the first temporary identifier is present in the list. In some exemplary embodiments, if the first temporary identifier is not found to be present in the list, Server 130 may assign the first temporary identifier to User Device 110, and keep an indication that the first temporary identifier can only be used by User Device 110 for a limited period of time.

In some exemplary embodiments, after the first temporary identifier is assigned to User Device 110, User Device 112 may send to Server 130 one or more reports of sensitive information using the first temporary identifier. In some exemplary embodiments, Server 130 may be configured to verify that the first temporary identifier is associated with the address of User Device 112. In some exemplary embodiments, since the first temporary identifier is not associated with the address of User Device 112 but is rather associated with the address of User Device 110, Server 130 may identify an adversary and discard the report from User Device 112, or assign it with a low weight. Additionally or alternatively, low scores may be provided to reports from User Device 110, such as based on the content of the reports, consistency or inconsistency indications, or the like. In some exemplary embodiments, a score may be determined using a plurality of reports from a same temporary identifier, based on the similarity between them, and whether or not they are consistent with an expected user profile. As an example, an expected user profile may be created based on the first N reports from User Device 110, and when additional reports are received, they may be checked for consistency with the expected user profile User Device 110.

In some exemplary embodiments, the list of active temporary identifiers may be managed by a server-side registry process. The server-side registry process may be decoupled from server-side processing of sensitive information reports sent by clients, e.g., User Devices 110-112. In particular, the responsibility to keep the registry (i.e., to ensure that no more than one temporary identifier is valid for any client in any given moment) could be delegated to a third party, such as a trustee registrar, for better and more transparent privacy protection.

In some exemplary embodiments, Server 130 may retain an expired list of inactive temporary identifiers that have been expired. In some exemplary embodiments, expired list may include all the expired temporary identifiers, a group of recently expired temporary identifiers (e.g., in the last day, week, or the like), or the like. In some exemplary embodiments, in case an expired list is retained, requested temporary identifiers in creation messages or re-creation messages are required to be excluded from both the expired list and the list of presently active temporary identifiers. In some exemplary embodiments, upon receiving a report, a creation message, or a re-creation message from a client using an expired temporary identifier, Server 130 may indicate to the client that the temporary identifier has expired, mark the client in the list as potentially malicious, consider this occurrence when determining a reliability score of the client, inspect a sending time of the message, to determine whether the message was sent prior to the expiration of the temporary identifier, or the like.

Figure 2:
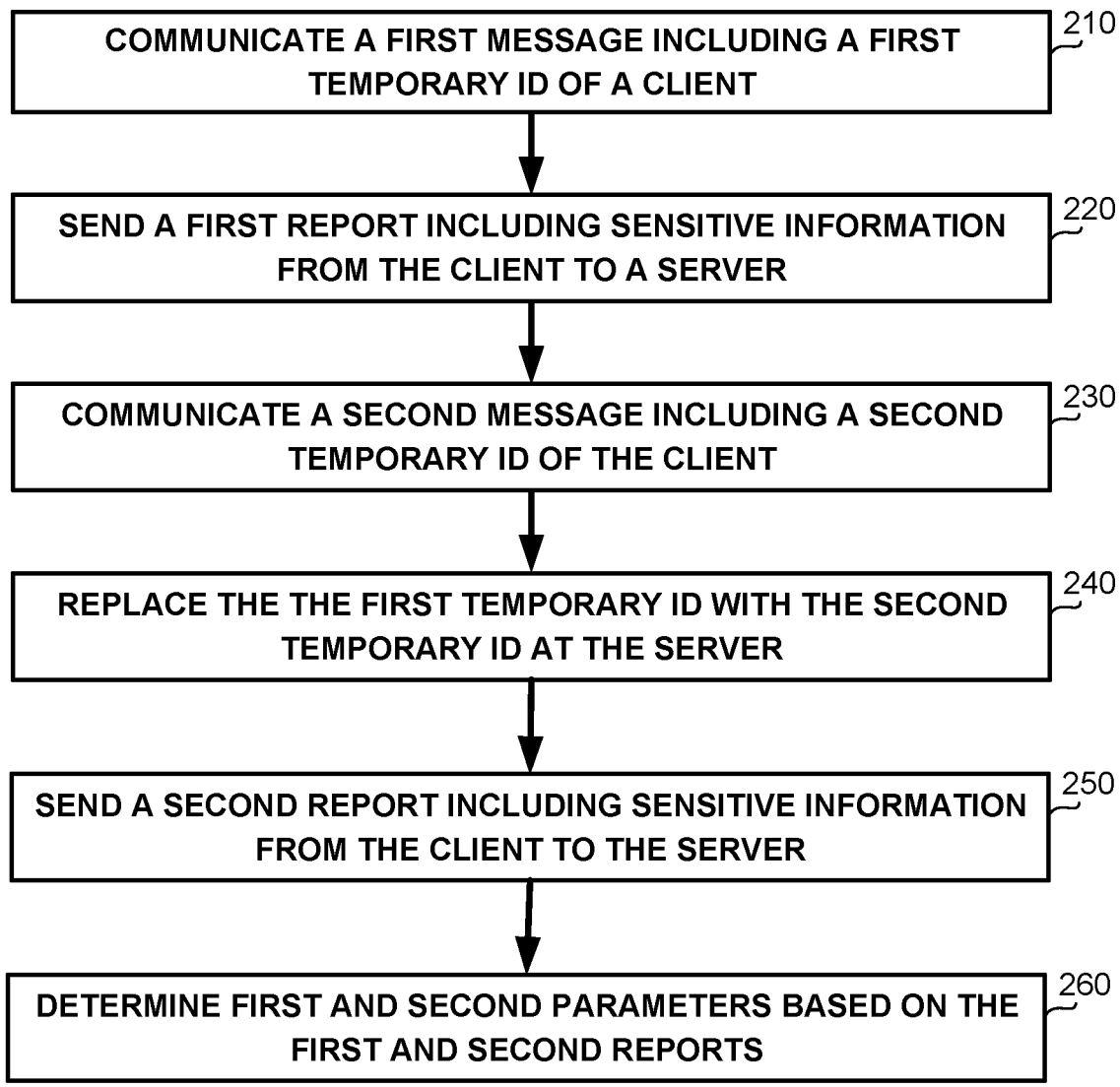
FIG. 2 illustrates a flowchart diagram of a method, in accordance with some exemplary embodiments of the disclosed subject matter.

Referring now to FIG. 2 showing a flowchart diagram of a method, in accordance with some exemplary embodiments of the disclosed subject matter.

On Step 210, a first message including a first temporary identifier of a client may be communicated between the client and a server, e.g., during a first period of time. In some exemplary embodiments, the first message may comprise an initial request to assign the first temporary identifier to the user device for the first period of time, and may be sent from the client to the server. In some exemplary embodiments, the first message may comprise a generated first temporary identifier generated at the server, and may be provided to the user device from the server for future use, e.g., during the first period of time. In some exemplary embodiments, the first message may comprise the first temporary identifier, a defined period during which the first temporary identifier is valid such as the first period of time, an expiration date or event of the first temporary identifier, a protocol for replacing the first temporary identifier, an address of the user device, or the like.

In some exemplary embodiments, the client or the server may be configured to create the first temporary identifier. In some exemplary embodiments, the first temporary identifier may be created by generating a random 128 bit number, a random 64 bit number, or the like. Additionally or alternatively, the first temporary identifier may be created by randomly selecting a free identifier from a list of unallocated identifiers. The first message may be communicated over an end-to-end encrypted channel, such as Transport Layer Security (TLS), Secure Sockets Layer (SSL), cryptographic protocols, or the like, or over non encrypted channels. Additionally or alternatively, the first message may comprise non-PII information of the client, such as demographic information of the user, technical attributes of the client itself, or other properties thereof. The server may store the first temporary identifier in a list of presently active temporary identifiers for a defined time period, e.g., the first period of time.

In some exemplary embodiments, the server may be configured to confirm or reject the first temporary identifier. In some exemplary embodiments, upon receiving at the server the first message with the first temporary identifier from the client, or generating the first temporary identifier at the server, the server may verify that the first temporary identifier has a valid format, has a valid value, or the like. As an example, a proposed temporary identifier may be rejected if it is identical to another active temporary identifier, if it is inconsistent with a format or protocol defining the temporary identifiers, or the like. If a proposed temporary identifier is not confirmed by the server, the client may be requested to generate another temporary identifier, or alternatively the server may generate a new temporary identifier, and Step 210 may be repeated until a temporary identifier is confirmed by the server.

In some exemplary embodiments, upon verifying the first message, the server may assign the first temporary identifier to the client and add the first temporary identifier to a list of active temporary identifiers of the server, e.g., based on identifying that the first temporary identifier is not located in the list of active temporary identifiers. In some exemplary embodiments, the server may keep, e.g., in a temporary manner, an indication that the first temporary identifier is associated with the client to which it was assigned. For example, such an indication may indicate an association between a MAC address of a client, or another non-temporary permanent identifier and its assigned temporary identifier. In some exemplary embodiments, upon replacing the first temporary identifier with a new temporary identifier, the MAC address of the client, or the other permanent identifier of the client, may be indicated to now be associated with the new temporary identifier instead of the first temporary identifier.

In some exemplary embodiments, in order to eliminate tracking of list modifications, the list of active temporary identifiers may be modified periodically, upon reaching a maximal threshold of requests to assign temporary identifiers, or the like. In some exemplary embodiments, the list of active temporary identifiers may be modified upon receiving an explicit instruction to modify the list, upon receiving a creation request, upon receiving a re-creation request, or the like. In some exemplary embodiments, temporary identifiers may be periodically changed according to one or more defined time lengths, predetermined quota, thresholds, or the like. In some exemplary embodiments, temporary identifiers may be valid during determined time lengths which may be defined for corresponding time periods, e.g., which may or may not be equal to one another. In some exemplary embodiments, time lengths of time periods may indicate that each time period is to be terminated after the time length has expired. In some exemplary embodiments, temporary identifiers may be valid until reaching a defined threshold such as a maximal number of communications, e.g., reports. In some exemplary embodiments, temporary identifiers may be valid until receiving an instruction, e.g., from the user, instructing to replace a temporary identifier.

In some exemplary embodiments, by controlling the initial identifiers, the server may prevent malicious agents from creating new clients. The server may allocate an initial identifier per each client, and enable the client to use that identifier and later on replace it. In such embodiment, the server may ensure that each client only has a single identifier and cannot generate a new initial identifier at will.

On Step 220, a first report including sensitive information from one or more sensors of the client's device may be sent from the client to the server. In some exemplary embodiments, during the first period of time, first sensitive information may be obtained from one or more sensors of the user device and included in the first report. In some exemplary embodiments, the client may provide the first report to the server using the first temporary identifier. For example, the first report may incorporate the first temporary identifier in one of its fields. In some exemplary embodiments, the data may be retained by the server as long as the sensitive information is provided during a valid timeframe when the temporary identifiers are valid, e.g., during the first period of time.

In some exemplary embodiments, the first sensitive information may include aggregated, processed, accumulated, or the like, sensor information, which may be aggregated, processed, accumulated, or the like, at the user device to create the first report. In some exemplary embodiments, the first sensitive information may comprise information that is sensitive for a user of the user device, e.g., data that in large quantities can be used to uniquely identify the user, to track activities or locations of the user, to identify activity patterns, to detect PII data of the user, or the like. In some exemplary embodiments, the first sensitive information may comprise additional non-sensitive information, e.g., non-PII data, information that cannot be used to uniquely identify the user, or the like.

In one example, the first sensitive information may include geolocation data obtained from the client associated with the first temporary identifier. In some exemplary embodiments, the geolocation data may be collected based on connectivity of the client to stationary Wi-Fi access points, Global Positioning System (GPS) signals, or the like.

In some exemplary embodiments, upon receiving at the server the first report of sensitive information that is associated with the first temporary identifier, the server may verify that the first report was sent during the first period of time, that the first report was sent from the user device, e.g., based on an address of the user device, that the first temporary identifier is currently active, or the like. As an example, the validation may be performed by querying internal or external registry, such as the list of presently active temporary identifiers. In some exemplary embodiments, in case the first report is verified, the first report may be stored by the server together with the first temporary identifier. For example, the server may retain a database of temporary identifiers, wherein each entry may include a report and an associated temporary identifier. In some cases, even if the first report is not verified, the first report may be retained, e.g., with a mark, a low reliability score, a low weight, or the like. In some cases, if the first report is not verified, the first report may be dropped, discarded, or the like. It may be noted that Step 220 may be repeated during the first period of time, while the client utilizes the same first temporary identifier for one or more additional sensor-based reports.

In some exemplary embodiments, scores for reports may be determined based on consistency (or lack thereof) with previously received reports that are associated with the same, e.g., first, temporary identifier. In some exemplary embodiments, a score may be given to the temporary identifier itself and not to reports directly, such as based on an AI-based identifier that indicates that the reports are consistent with malicious activity, the temporary identifier may be provided with a reduced score. Additionally or alternatively, anomaly detection may be utilized to identify potentially malicious behavior and reduce the score of the associated temporary identifier. A score of the temporary identifier may be utilized in scoring the importance of reports issued thereby when processing the reports to determine any insights or extract other information therefrom. In some exemplary embodiments, when a score of a temporary identifier is updated, the score of all of its reports (that are identified using the same temporary identifier) may be updated accordingly. After the temporary identifier is discarded, the score of the reports may be retained therein. Additionally or alternatively, when a scored temporary identifier is updated, the server may retain the scored temporary identifier in a list of scored temporary identifiers, e.g., to be utilized when analyzing reports from the temporary identifier.

On Step 230, a second message including a second temporary identifier of the client may be communicated between the client and the server, e.g., during a second period of time after the first period of time. In some exemplary embodiments, in order to identify an end of the first period of time, an expiration event of the first temporary identifier may be identified based on a defined time length after which each time period is to be terminated, a defined time length after which the first temporary identifier is configured to be terminated, a number of reports using the first temporary identifier that were sent to the server, and a direct instruction from the user of the user device to switch the first temporary identifier, or the like. In some exemplary embodiments, the second message may be communicated in response to identifying the expiration event.

In some exemplary embodiments, the second message may comprise an indication that the first temporary identifier is requested to be replaced with the second temporary identifier for the second period of time. In some exemplary embodiments, the second message may comprise a previous temporary identifier (e.g., the first temporary identifier), a newly created temporary identifier (e.g., the second temporary identifier), a period of time during which the second temporary identifier is valid such as the second period of time, an expiration date or event of the second temporary identifier, a protocol for replacing the second temporary identifier, an address of the user device, or the like. In some exemplary embodiments, the client or the server may generate the second temporary identifier, such as by generating a random 256 bit number, until the generated number is unique and unused in the current list of active clients.

In some exemplary embodiments, the first and second temporary identifiers may be generated at the user device, and transmitted to the server. In some exemplary embodiments, the first and second temporary identifiers may be generated at the server, and transmitted to the user device. In some exemplary embodiments, upon identifying that the address of the user device that is associated with the first temporary identifier is identical to the address of the user device from which the second message is received, the server may associate the address of the user device with the second temporary identifier, e.g., instead of the first temporary identifier.

On Step 240, the first temporary identifier may be replaced with the second temporary identifier, e.g., in the list of active clients at the server. In some exemplary embodiments, a list of presently active temporary identifiers may be kept at the server. As each client may periodically change its temporary identifier and update the server with the change, the server may be configured to update the list to comply with each such change. The list may be updated by inserting the new temporary identifier thereto, and removing the old temporary identifier therefrom.

In some exemplary embodiments, the server may be configured to identify whether the previous temporary identifier (e.g., the first temporary identifier) appears in the list of active clients. If the previous temporary identifier does not appear in the list, the new temporary identifier (e.g., the second temporary identifier) would not be added, as such operation would increase the total number of clients in the list to be more than the actual number of clients that the server recognizes. In some exemplary embodiments, any report with unknown temporary identifiers, such as an identifier not included in the list of active temporary identifiers, may be discarded.

In some exemplary embodiments, in response to receiving and verifying the second message, the server may be configured to exclude the first temporary identifier from the list of active temporary identifiers retained by the server, and insert the second temporary identifier thereto. In some exemplary embodiments, any non-PII information of the client may be assigned to the second temporary identifier. The non-PII information may include any non-PII information obtained based on reports utilizing the first temporary identifier, or any information previously deduced from the activities of the client that is non-PII.

In some exemplary embodiments, the relationship between the first and second temporary identifiers may not be retained in the server, thereby preventing the server from associating, in the future, reports identified with the first temporary identifier with reports identified with the second temporary identifier.

In some exemplary embodiments, at the creation point of the second temporary identifier, metadata relating to the user device identified using the first temporary identifier may be copied and used as metadata for the second temporary identifier. The metadata may be non-sensitive data, non-PII data, or the like. In some exemplary embodiments, the metadata may be a score of the user device, anonymous demographic information or user profile description, or the like. In such a manner, information gleaned from previous reports, such as based on sensitive information reflecting behavior of the user device, may be retained for the new temporary identifier, without providing the base information that was used to deduce such conclusion. It is noted that if the metadata of the second temporary identifier is modified, e.g., in view of additional information obtained, the metadata of the first temporary identifier remains unchanged, as there may be no linkage between the two identifiers in retrospect.

On Step 250, a second report including sensitive information from one or more sensors of the client's device may be sent from the client to the server, e.g., during the second period of time. In some exemplary embodiments, the sensitive information may be obtained similarly to obtaining the first sensitive information. As an example, the first sensitive information may include location information obtained from the one or more sensors of the user device at a first location, and the second sensitive information may include location information obtained from the one or more sensors of the user device at a second location. In some exemplary embodiments, upon receiving at the server the second report of sensitive information that is associated with the second temporary identifier, the server may verify and store the second report together with the second temporary identifier, e.g., similarly to verifying and storing the first report.

In some exemplary embodiments, the second report may be stored in association with the second temporary identifier of the user device, but not with the first temporary identifier. In some exemplary embodiments, the second report may not be directly matched with the first report, e.g., based on temporary identifiers of the reports. For example, the server may retain a database of temporary identifiers, wherein an entry of the second report includes the second temporary identifier and not the first temporary identifier. In some exemplary embodiments, the first report may not be associated with the second report, e.g., in the database, list, or the like. Accordingly, an entity that may analyze the reports may not be able to directly match the first report with the second report and may not be able to conclude that the first and second reports are related to a same client device. In some exemplary embodiments, an analysis of user behavior may conclude or infer a first user behavior associated with the first temporary identifier, e.g., based on the first report, and a second user behavior associated with the second temporary identifier, e.g., based on the second report. In some exemplary embodiments, potentially different user behaviors may be determined for a same user, e.g., based on potential differences between reports from the first and second temporary identifiers. In some exemplary embodiments, an analysis of user behavior may differentiate reports associated with the first temporary identifier from reports associated with the second temporary identifier, e.g., in a same manner that reports associated with the first temporary identifier may be differentiated from reports associated with a third temporary identifier of a second client different than the client. It may be noted that Step 250 may be repeated during the second period of time, e.g., until sending a new re-creation message to the server, when Step 240 is then performed with yet another temporary identifier.

In some exemplary embodiments, prior to communicating the second message between the user device and the server, an intermediate temporary identifier may be generated at the user device, and an intermediate message may be transmitted to the server. In some exemplary embodiments, the intermediate message may comprise a request to assign the intermediate temporary identifier to the user device. In some exemplary embodiments, upon identifying at the server that the intermediate temporary identifier is located in the list of active temporary identifiers, that the intermediate temporary identifier is invalid, or the like, the request of the intermediate message may be declined. In some exemplary embodiments, declining the intermediate message may comprise sending to the user device a response indicating that the intermediate temporary identifier is not available, ignoring the intermediate message, avoiding from sending an acknowledgement, or the like. In some exemplary embodiments, upon receiving a decline message from the server indicating a decline of the request, e.g., due to the intermediate temporary identifier being listed in the list of active temporary identifiers, the second temporary identifier may be generated at the user device, and the second message may be transmitted to the server. In some exemplary embodiments, upon waiting a predetermined time period without receiving an acknowledgement from the server indicating that the request is accepted, e.g., due to the intermediate temporary identifier being listed in the list of active temporary identifiers, the second temporary identifier may be generated at the user device, and the second message may be transmitted to the server.

On Step 260, the first analysis may be performed by analyzing one or more reports of sensitive information associated with the first temporary identifier in the server's database to determine a first advertising parameter of a first client, and the second analysis may be performed by analyzing one or more reports of sensitive information associated with the second temporary identifier in the database to determine a second advertising parameter of a second client. In some exemplary embodiments, based on the first advertising parameter, an advertising profile of the first client may be created, and based on the second advertising parameter, an advertising profile of the second client may be created. In some exemplary embodiments, the advertising profile of the first client may not be associated with the advertising profile of the second client, e.g., although they both originated from a same user. In some exemplary embodiments, based on the first and second advertising parameters, one or more behavioral patterns and statistical results that may be useful for advertising may be determined. In some exemplary embodiments, a profile or parameters of the second temporary identifier may be based on non-PII information that may be obtained or determined based on reports from the first temporary identifier, e.g., which may be attached to the second temporary identifier upon assigning the second temporary identifier to the client.

In some exemplary embodiments, the first and second analyses may not be associated with a same user. In some exemplary embodiments, the server may not suggest that any association, e.g., of a user's identity, exists between the first sensitive information and the second sensitive information. For example, a user device of a user may be assigned with a temporary identifier during morning hours and may provide to the server one or more location reports indicating that the user is located at a working place. After a few hours, the user device may replace its temporary identifier with a new identifier while the user is eating lunch, and provide to the server one or more location reports indicating that the user is located at a certain restaurant. The server may retain the location reports obtained at the working place with a separate identifier than the location reports obtained at the restaurant, thus eliminating any link between the different locations. Accordingly, an adversary, the server, or any third party which may gain access to the server's storage, may not be able to link the user's activity at the restaurant with the user's working place since they may be kept with different identifiers. In some exemplary embodiments, the entire tracking list of the temporary identifiers for the given client may never be stored at the server. Hence, it may be impossible to aggregate the different reported locations of the client over a timeframe in which more than one temporary identifier was used (e.g., over 12 hours, over one day, over 10 days, over 100 days, or the like).

In some exemplary embodiments, the server may analyze stored reports, or provide access to the stored reports to analyzing parties. In some exemplary embodiments, the server or the analyzing parties may perform any analyses of the reports, such as performing a first analysis of client behavior during the first period of time based on the reports associated with the first temporary identifier, and a second analysis of client behavior during the second period of time based on the reports associated with the second temporary identifier, while the first and second analyses may not be associated with a same client. For example, referring to the example mentioned above, a first analysis of client behavior may be based on behaviors of the user that were identified at the working place, and a second analysis of client behavior may be based on behaviors of the user that were identified at the restaurant. In some exemplary embodiments, although patterns and statistical results that may be extracted from disconnected portions of sensor data may be less precise and less personalized than what could be extracted from tracking complete sessions of sensor data, they may nevertheless provide high quality outputs that are sufficient for third party purposes, such as advertising, while preserving the users' privacy. It may be noted that a sufficiently large time period (such as covering several days) may suffice to extract high quality information, while preserving privacy of the user.

Figure 3:
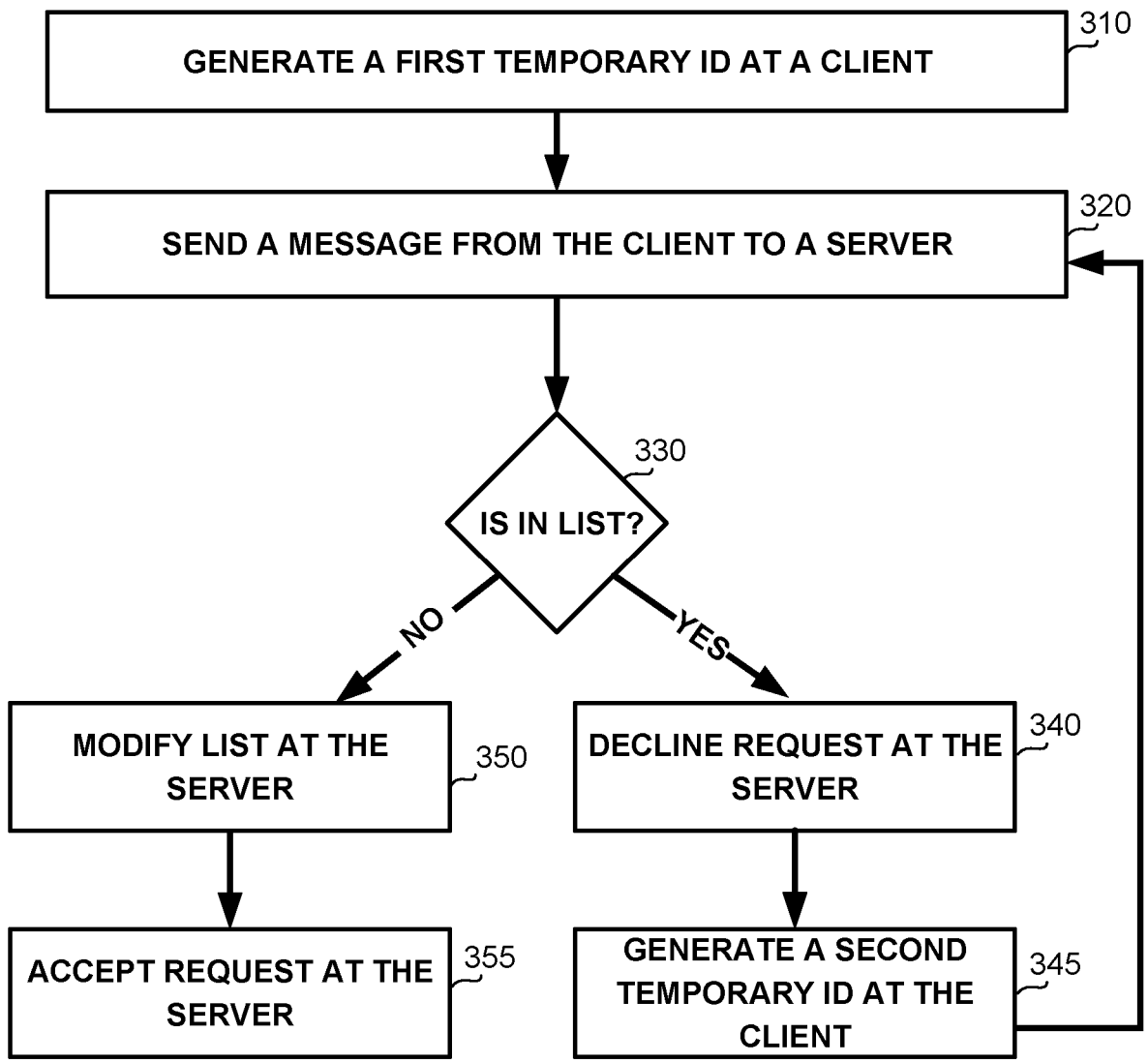
FIG. 3 illustrates a flowchart diagram of a method, in accordance with some exemplary embodiments of the disclosed subject matter.

Referring now to FIG. 3 showing a flowchart diagram of a method, in accordance with some exemplary embodiments of the disclosed subject matter.

On Step 310, a first temporary identifier may be generated at a client, e.g., by generating a random 128 bit number, by randomly selecting a free identifier from a list of unallocated identifiers, or the like. In some exemplary embodiments, the first temporary identifier may be generated to include a string, number, or value that is long enough to prevent or reduce likelihood of any collision.

On Step 320, a message, e.g., including the first temporary identifier, may be transmitted from the client to a server. In some exemplary embodiments, the message may indicate that the first temporary identifier is requested to be assigned to the client. In some exemplary embodiments, the first message may be generated and communicated similarly to the description of Steps 210 and 230 (FIG. 2) with respect to the first and second messages.

On Step 330, the server may receive the message and examine a list of presently active temporary identifiers to determine whether or not the first temporary identifier is listed thereon. In some exemplary embodiments, a list of presently active temporary identifiers may be kept at the server. As each client may periodically change the temporary identifier thereof and update the server with the change, the server may be configured to update the list after each such change. The list may be updated by inserting the new temporary identifier thereto, and removing the old temporary identifier therefrom. In some exemplary embodiments, if the first temporary identifier is listed in the list, the method flow may continue to Step 340, and if the first temporary identifier is not listed in the list, the method flow may continue to Step 350.

On Step 340, when the first temporary identifier is listed in the list of presently active temporary identifiers, the request to assign the first temporary identifier to the client may be declined. In some exemplary embodiments, a decline message may be provided to the client, or alternatively an agreed-upon protocol may define that ignoring the request for a predetermined timeframe may indicate that the request is declined. In some exemplary embodiments, in case the first temporary identifier is generated by the server, there may be no need to notify the respective client of the server's failure.

On Step 345, a second temporary identifier may be generated at a client. The method flow may return to Step 320 for one or more iterations, for example, until an identifier generated at Step 345 is not identified in the list of presently active temporary identifiers, e.g., at Step 330, and the method flow can continue to Step 350.

On Step 350, when the examined temporary identifier, e.g., the first temporary identifier, is not listed in the list of presently active temporary identifiers, the server may modify the list of presently active temporary identifiers, for example, to include the first temporary identifier and possibly exclude a previous temporary identifier of the client, if such an identifier exists.

On Step 355, the server may accept the request to assign the first temporary identifier, e.g., or any other subsequent temporary identifier generated at Step 345, to the client. In some exemplary embodiments, an acceptance message or an indication of acceptance may be provided to the client, or alternatively an agreed-upon protocol may define that ignoring the request for a predetermined timeframe may indicate that the request is accepted.

Figure 4:
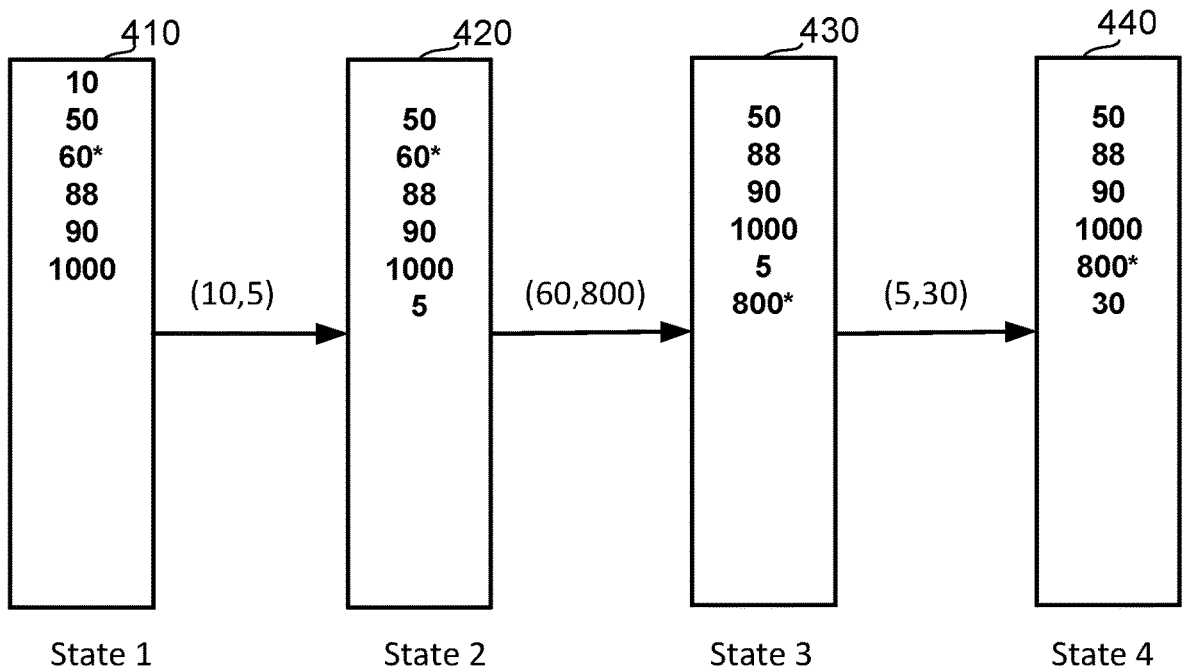
FIG. 4 illustrates a schematic illustration of an exemplary environment and architecture for communicating with a server in which the disclosed subject matter may be utilized, in accordance with some exemplary embodiments of the disclosed subject matter.
Figure 4:
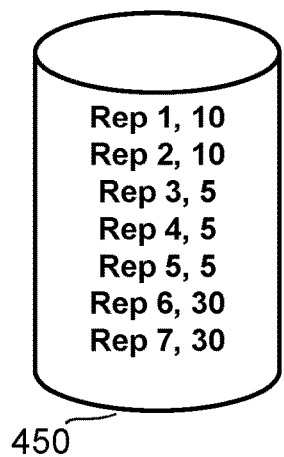

Referring now to FIG. 4 showing an illustration of a computerized environment for communicating with a server, in accordance with some exemplary embodiments of the disclosed subject matter.

In some exemplary embodiments, a list of presently active temporary identifiers may be kept by the server. As each client may periodically change its temporary identifier thereof and update the server with the change, the server may be configured to update the list after each such change. The list may be updated by inserting the new temporary identifier thereto, and removing the old temporary identifier therefrom. The entire tracking list of the temporary identifiers for the given client may never be stored at the server, e.g., to avoid privacy violations. Additionally or alternatively, the mapping between an old temporary identifier and a new temporary identifier, as provided in the re-creation message, may not be retained at the server.

As an example, List 410 may comprise all active temporary identifiers of clients at a first state (denoted State 1). List 410 may be retained at the server. In the next state (denoted State 2), a client associated with identifier 10 may replace the temporary identifier with a new identifier 5, and may update the server regarding the change (e.g., via a re-creation message). The server may update List 410 to List 420 accordingly by deleting identifier 10 from the list and adding identifier 5 thereto. Similarly, the client associated with identifier 10 at State 1, that was replaced with identifier 5 at State 2, may replace identifier 5 with a new identifier 30 after the third state (denoted State 3). Accordingly List 430 may be updated to List 440 by inserting identifier 30 thereto and removing identifier 5 therefrom.

Simultaneously, Database 450, which may be retained by the server, may comprise sensitive information obtained from all clients. Database 450 may be configured to retain all the aggregated reports received from the clients, along with temporary identifiers that were assigned to each client when the report was received and corresponding scores, e.g., of reliability. Database 450 is illustrated with respect to a single client, having the temporary identifiers 5, 10 and 30. However, the server is unaware of the fact that the three temporary identifiers are, in actuality, representing a same client.

As an example, Reports 1 and 2 (denoted "Rep 1" and "Rep 2") may be received from the client, when using identifier 10. Reports 3-5 (denoted "Rep 3", "Rep 4", and "Rep 5") may be received the client, when using identifier 5. Reports 6 and 7 (denoted "Rep 6" and "Rep 7") may be received from the client, when using identifier 30. As a result, the server cannot link between the reports received from the client and track the clients' activities over time. However, the server may track the reports of the client while using the same temporary identifier, which can be limited to a specific timeframe, number of reports (e.g., after 100 reports replace temporary identifier), or the like, and yet be useful for one or more applications. Additionally or alternatively, the client may purposefully change its temporary identifier to force cleaving old information relating thereto.

In some exemplary embodiments, a client may be identified as having a low reliability based on his reports having a low similarity to each other, not being consistent with an expected user profile of the client, being contradictory, having an abnormal quantity of sensitive information in a single report, having an abnormal quantity of reports within a timeframe, having an inconsistency between reports, or the like. In some exemplary embodiments, once a client is identified as having a low reliability, as being suspicious, or the like, e.g., based on client data, the identifier associated therewith may be marked. In some cases, a throttle algorithm may be applied to reports with the same temporary identifier, to determine the rate at which the client is providing data, and the reliability of such data. Data received from identifiers marked as having a low reliability may be dropped, discarded, assigned with lower weights, or the like. As an example, identifier 60 may be marked in List 410 as having a low reliability score based on one or more suspicious activities, data, or the like. The marking may remain also in List 420, where the identifier is unchanged.

In some exemplary embodiments, when the temporary identifier is replaced with a new temporary identifier, the marking of the original temporary identifier having the low reliability score may still be maintained with the new temporary identifier and with reports from the temporary identifier. As an example, when the client associated with identifier 60 creates a new identifier 800, and updates the server with the change, the server may update List 420 to List 430 by deleting identifier 60 from the list and adding identifier 800 thereto, while assigning the low reliability marking of identifier 60 to identifier 800 and to reports from identifier 60. As can be appreciated, the source of the marking of identifier 800 as having low reliability cannot be reconstructed by the server, as the source of such marking is the sensitive information associated with temporary identifier 60.

Figure 5:
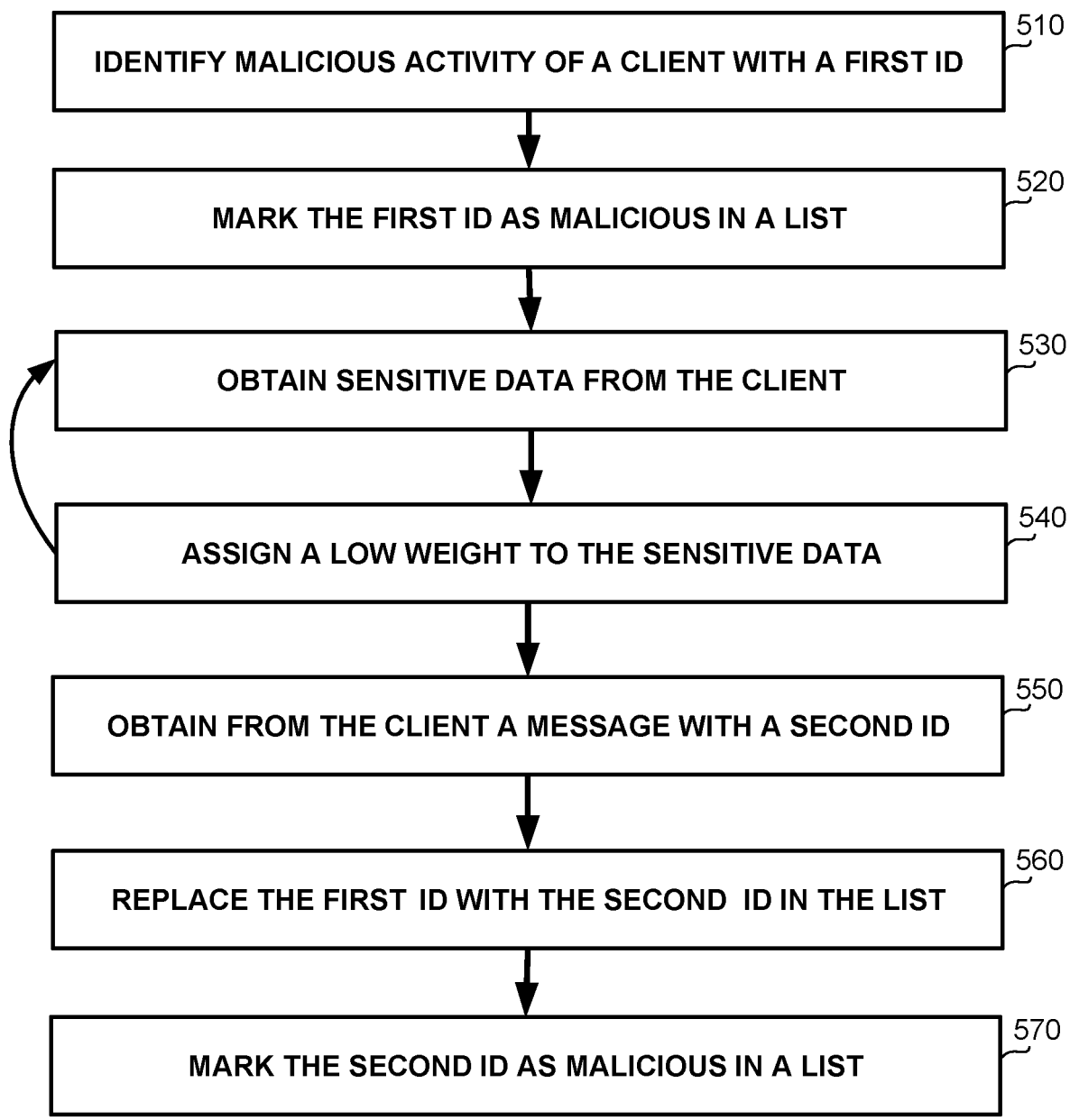
FIG. 5 illustrates a flowchart diagram of a method, in accordance with some exemplary embodiments of the disclosed subject matter.

Referring now to FIG. 5 showing a flowchart diagram of a method, in accordance with some exemplary embodiments of the disclosed subject matter.

On Step 510, malicious activity may be identified with respect to the sensitive information received from a client with a first temporary identifier. In some exemplary embodiments, the sensitive information may comprise non-sensitive information in addition to sensitive information, or may enable to infer non-sensitive information based on the sensitive information.

In some exemplary embodiments, temporary identifiers may be determined to be associated with malicious activity based on identifying contradictory sensitive information associated with a temporary identifier reported in different reports, identifying a low similarity between reports from a temporary identifier, identifying an inconsistency of reports associated with a temporary identifier, identifying an inconsistency of reports from a temporary identifier with an expected user profile of the temporary identifier, e.g., which may be inferred based on previous information from the same client, an abnormal quantity of information in an associated report, an abnormal quantity of reports associated with the temporary identifier during the corresponding period of time, corrupt or contradictory sensitive information from a same temporary identifier, a mismatch between a client and his temporary identifier, or the like. As an example, sensitive information may be determined to be sent from an adversary when having contradictions, such as reporting about being in different locations or substantially distinct locations at the same time. Additionally or alternatively, the client may send a large volume of sensitive information that is inconsistent with normal behavior, and thus its sensitive information may be considered as having low reliability. It is noted, that the deduction may be based on the data provided by the client, or based on any other data available to the server, to a third party, to a user, or the like.

In some exemplary embodiments, in addition to identifying malicious temporary identifiers, a client himself may be identified as potentially malicious, for example, upon receiving a report of sensitive information associated with a temporary identifier from the client, when the temporary identifier was assigned to a different client, was not assigned at all, or the like. In some exemplary embodiments, non-PII or non-sensitive information that may be inferred from reports associated with previous temporary identifiers of a client may be attached to a current temporary identifier of the client and utilized to classify the current activity of the client and modify his reliability score. In some exemplary embodiments, a classifier may be trained to infer non-PII or non-sensitive information from reports, to classify activities of the clients based thereon, or the like.

For example, non-PII information may be inferred from reports from a first temporary identifier assigned to a client, which may have a first reliability score such as 6 out of 9, and utilized to create a client profile of the client. At some point, the client may replace the first temporary identifier with a second temporary identifier. Reports from the second temporary identifier of the client may be analyzed, e.g., by the server, to determine consistency with the client profile. In some cases, a low consistency rate may reduce a score of the second temporary identifier, e.g., to 5 out of 9, while a high consistency rate may enhance a score of the second temporary identifier. In some cases, upon reducing a score of the second temporary identifier to 5, reports from the second temporary identifier may be retained in a reports database along with a score value of 5, while reports from the first temporary identifier may be retained in the reports database along with a score value of 6, although they originated from a same client. In some exemplary embodiments, although the non-PII information may be provided based on data from the first temporary identifier of the client, the server may not retain any indication that the non-PII information is associated with the first temporary identifier, and may merely attach the non-PII information to the second temporary identifier upon assigning the second temporary identifier to the client. Accordingly, scores of reports from the first temporary identifier may not be modified regardless of future activity of the client.

On Step 520, the first temporary identifier may be marked as potentially malicious, e.g., in a list of presently active temporary identifiers. In some exemplary embodiments, a reliability analysis of client reports may be configured to determine a reliability score for the first temporary identifier based on reports of sensitive information associated with the first temporary identifier. In some exemplary embodiments, in response to determining that a reliability score of the first temporary identifier is below a threshold, the first temporary identifier may be marked with an unreliability indication in the list of active temporary identifiers. In some exemplary embodiments, the server may determine that the first temporary identifier is associated with malicious activity, and mark the first temporary identifier as potentially malicious. In some exemplary embodiments, the first temporary identifier may be marked when having a corresponding low reliability score.

In some exemplary embodiments, the server may track malicious activity by marking identifiers as potentially malicious, unreliable, or the like, e.g., with an unreliability indication, and passing on the mark to subsequent identifiers replacing the marked identifier. In some exemplary embodiments, when the list of active temporary identifiers is modified and the first temporary identifier is replaced with the second temporary identifier, the second temporary identifier may be marked as unreliable as well. In some exemplary embodiments, reports obtained from marked users may be assigned with a low weight, may be dropped, may be discarded, may be assigned with a low reliability score, or the like. The marking of the reports may be retained by the server, e.g., in a reports database, or otherwise remain accessible thereto for future processing.

In some exemplary embodiments, a mark may merely indicate that the marked identifier is potentially malicious, has a reliability score below a threshold, or the like. In some exemplary embodiments, a mark may indicate more detailed information, e.g., indicating a specific reliability score such as between 1 and 10 indicating how malicious, how dangerous, how reliable, a certainty level thereof, or the like, the identifier may be considered. In some exemplary embodiments, a reliability score may be determined based on heuristics, user rules, classifiers, or the like. In some exemplary embodiments, a reliability score may be assigned to each client based on the determined reliability of the client as a source of information. In some exemplary embodiments, a reliability score below a threshold may result with marking the temporary identifier as unreliable, attaching the score to the temporary identifier, or the like. In some exemplary embodiments, all reliability scores may be attached to temporary identifiers in the list, e.g., regardless of a threshold.

In some exemplary embodiments, upon determining that a reliability score of a temporary identifier is below a threshold, the temporary identifier may be marked in the list of active temporary identifiers. Accordingly, temporary identifiers that have different scores but are both marked may not be distinguishable to the server. In some exemplary embodiments, upon determining that a reliability score of the first temporary identifier is below a threshold, or regardless of a threshold, the first temporary identifier may be marked with the specific determined reliability score in the list of active temporary identifiers, and temporary identifiers that have different scores may be marked accordingly so that the server may distinguish between them.

On Step 530, sensitive information may be obtained from the client with the first temporary identifier. The sensitive information may be obtained similarly to the sensitive information obtained on Steps 220 and 250 (FIG. 2).

On Step 540, sensitive information obtained from the client with the first temporary identifier, may be assigned with low weights. In some exemplary embodiments, since the first temporary identifier may be marked with an unreliability indication in the list of active temporary identifiers, each report of sensitive information that is associated with the first temporary identifier may be assigning with a corresponding unreliability indication. In some exemplary embodiments, lower weights may be assigned to sensitive information based on the low reliability scores of temporary identifiers or clients. In some exemplary embodiments, since the first temporary identifier is marked in the list of active temporary identifiers as having a reliability score below a threshold, the sensitive information may be assigned with a zero weight and thus be discarded, dropped, or assigned with a uniformed weight that is lower than a weight of non-marked temporary identifiers. For example, all temporary identifiers having a reliability score below a threshold may be marked in a unified form and may be assigned a weight of 50%, e.g., compared to non-marked temporary identifiers. In some exemplary embodiments, if the first temporary identifier is marked with a specific reliability score in the list of active temporary identifiers, a proportionally low weight may be assigned to the sensitive information. For example, sensitive information from a temporary identifier having a score of 1 out of 9 may be dropped (or assigned a weight of zero), while sensitive information from a temporary identifier having a score of 5 out of 9 may be given a semi-proportional weight, e.g., 30% lower than a maximal weight. In some exemplary embodiments, instead of discarding the low reliability data, low reliability may be translated to lower weights that may be used when the data is analyzed, so as to avoid skewing the data based on data having low reliability. In some exemplary embodiments, a throttle algorithm may be applied to reports with a same temporary identifier. As result, overwhelming the server with skewed data may be prevented, while excluding a possibility to track the client's history. Other algorithms may be utilized to identify potential malicious activity or skewed data, and attribute low weights to such data.

In some exemplary embodiments, sensitive information obtained in association with a temporary identifier may be marked according to a score of the temporary identifier, e.g., upon being obtained, upon replacing the temporary identifier, periodically during an active period of the temporary identifier, or the like. In some exemplary embodiments, the score of the temporary identifier may be based on sensitive information obtained using the temporary identifier, based on non-sensitive or non-PII information obtained from previous temporary identifiers of the client which may be associated to the temporary identifier upon assigning the temporary identifier to the client, or the like.

In some exemplary embodiments, weights of sensitive information may affect the analysis of the sensitive information and change an application thereof. For example, advertising or location applications that utilize sensitive information may rely more on sensitive information with high reliability scores in their calculations.

On Step 550, a message with a second temporary identifier may be obtained from the client, from the server, or the like, e.g., indicating that the second temporary identifier is to replace the first temporary identifier. Step 550 may be performed in a similar manner to Step 230 (FIG. 2). In some exemplary embodiments, the reports of sensitive information associated with the first temporary identifier may be assigning with the unreliability indication prior to communicating the message of the second temporary identifier between the client and the server.

On Step 560, upon validating the message, the first temporary identifier may be replaced with the second temporary identifier, e.g., in the list of presently active temporary identifiers. Step 560 may be performed in a similar manner to Step 240 (FIG. 2). In some exemplary embodiments, at the creation point of the second temporary identifier, metadata relating to the client identified using the first temporary identifier may be copied and used as metadata for the second temporary identifier. The metadata may be non-sensitive data, non-PII data, or the like. In some exemplary embodiments, the metadata may be a score of the user device, anonymous demographic information or user profile description, or the like. In such a manner, information gleaned from previous reports, such as based on sensitive information reflecting behavior of the user device, may be retained for the new temporary identifier, without providing the base information that was used to deduce such conclusion. It is noted that if the metadata of the second temporary identifier is modified, e.g., in view of additional information obtained, the metadata of the first temporary identifier remains unchanged, as there may be no linkage between the two identifiers in retrospect.

On Step 570, the second temporary identifier may be marked as unreliable, e.g., in the list of presently active temporary identifiers. In some exemplary embodiments, the malicious marking of the first temporary identifier may be retained and passed on to the second temporary identifier, e.g., as well as non-PII metadata of the first temporary identifier. In some exemplary embodiments, sensor-based reports obtained from the first temporary identifier may be scored with the malicious marking of the first temporary identifier, while reports obtained from the second temporary identifier may be scored with the marking of the second temporary identifier, which may develop over time based on the content or quantity of the reports from the second temporary identifier, based on metadata from the first temporary identifier, or the like.

Figure 6:
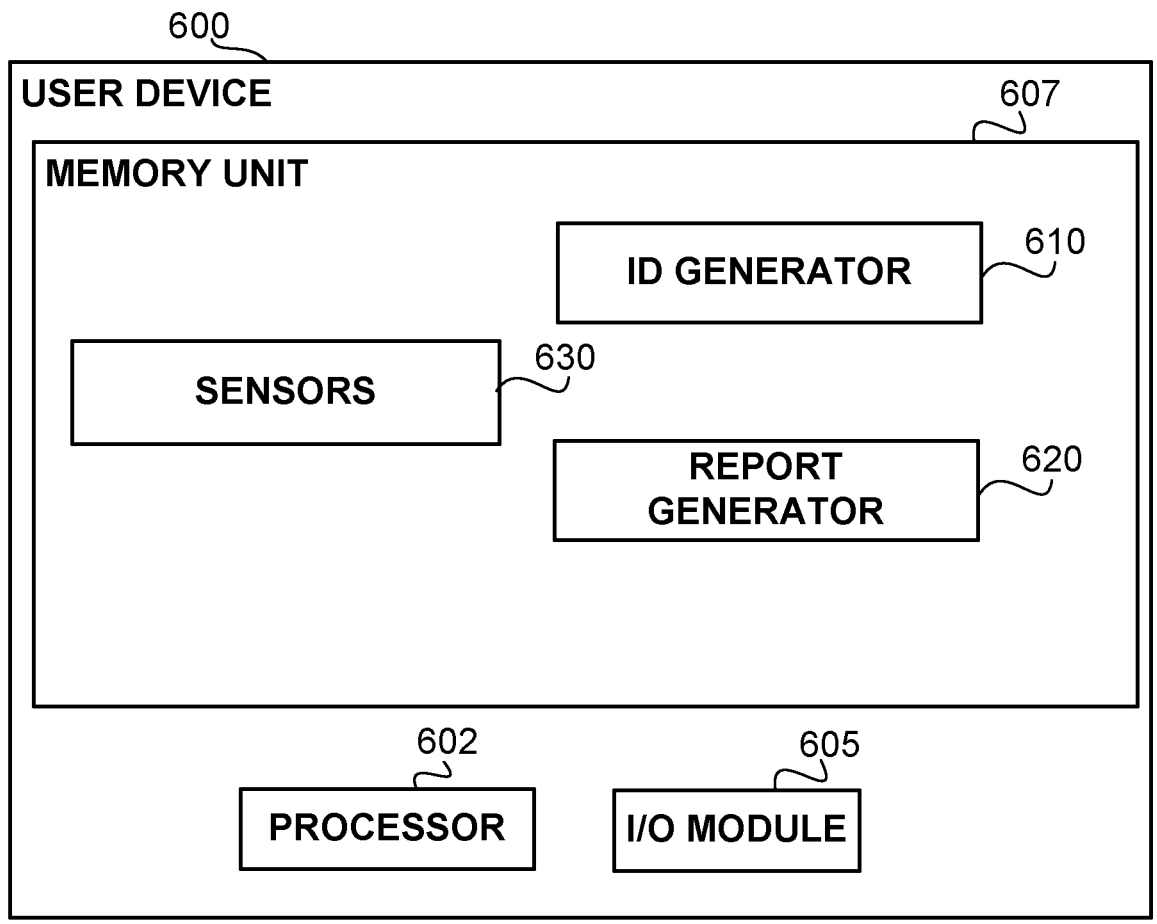
FIG. 6 illustrates a block diagram of a user device, in accordance with some exemplary embodiments of the disclosed subject matter.

Referring now to FIG. 6 showing a block diagram of components of a user device, in accordance with some exemplary embodiments of the disclosed subject matter.

In some exemplary embodiments, a User Device 600 may comprise a Processor 602. Processor 602 may be a Central Processing Unit (CPU), a microprocessor, an electronic circuit, an Integrated Circuit (IC) or the like. Processor 602 may be utilized to perform computations required by User Device 600 or any of its subcomponents. Processor 602 may be configured to execute computer-programs useful in performing the method of FIG. 2, 3, 5, or the like.

In some exemplary embodiments of the disclosed subject matter, an Input/Output (I/O) Module 605 may be utilized to provide an output to and receive input from a user. I/O Module 605 may be operatively coupled to a touch screen, a mouse, a keyboard or a similar device which may be used for receive input from the user. I/O Module 605 may be operatively coupled to a display (not shown), speaker (not shown) or a similar device which may be used for providing feedback or reports to the user. I/O Module 605 may further be used to transmit and receive information to and from the user or any other apparatus in communication therewith.

In some exemplary embodiments, User Device 600 may comprise a Memory Unit 607. Memory Unit 607 may be a short-term storage device or long-term storage device. Memory Unit 607 may be a persistent storage or volatile storage. Memory Unit 607 may be a disk drive, a Flash disk, a Random Access Memory (RAM), a memory chip, or the like. In some exemplary embodiments, Memory Unit 607 may retain program code operative to cause Processor 602 to perform acts associated with any of the subcomponents of User Device 600. In some exemplary embodiments, Memory Unit 607 may retain program code operative to cause Processor 602 to perform acts associated with any of the steps in FIG. 2, 3, 5, or the like.

In some exemplary embodiments, User Device 600 may comprise Sensors 630. In some exemplary embodiments, Sensors 630 may comprise built-in sensors of User Device 600, attached sensors, connected sensors, accessible sensors, or the like. In some exemplary embodiments, Sensors 630 may comprise a GNSS receiver, an RSSI determinator, a Wi-Fi receiver, an RTT receiver, accelerometers, gyroscopes, or the like. In some exemplary embodiments, Sensors 630 may be configured to participate in a crowdsensing operation, e.g., via I/O Module 605.

The components detailed below may be implemented as one or more sets of interrelated computer instructions, executed for example by Processor 602 or by another processor. The components may be arranged as one or more executable files, dynamic libraries, static libraries, methods, functions, services, or the like, programmed in any programming language and under any computing environment.

In some exemplary embodiments, Identifier (ID) Generator 610 may be configured generate temporary identifiers that may be proposed for being assigned to User Device 600. In some exemplary embodiments, Identifier Generator 610 may generate a temporary identifier by generating a random 128 bit number, a random 64 bit number, or the like. In some exemplary embodiments, Identifier Generator 610 may generate the temporary identifier to include a string, number, or value that is long enough to prevent or reduce likelihood of any collision.

In some exemplary embodiments, Identifier Generator 610 may provide the temporary identifier to a server, and upon being rejected, upon expiration of the temporary identifier, upon receiving user instructions, or the like, Identifier Generator 610 may generate a new temporary identifier.

In some cases, User Device 600 may exclude Identifier Generator 610, and temporary identifier may be generated by the server, and provided to by the server to User Device 600.

In some exemplary embodiments, Report Generator 620 may be configured to obtain sensor reading from Sensors 630, and aggregate, process, accumulate, or the like, the sensor reading to create a report. In some exemplary embodiments, Report Generator 620 may be configured to obtain a temporary identifier from Identifier Generator 610, from a server, e.g., via I/O Module 605, or the like, and incorporate the temporary identifier within the report.

In some exemplary embodiments, Report Generator 620 may be configured to provide, transmit, send, or the like, the report to the server, e.g., via I/O Module 605, or via any crowdsensing technique.

Figure 7:
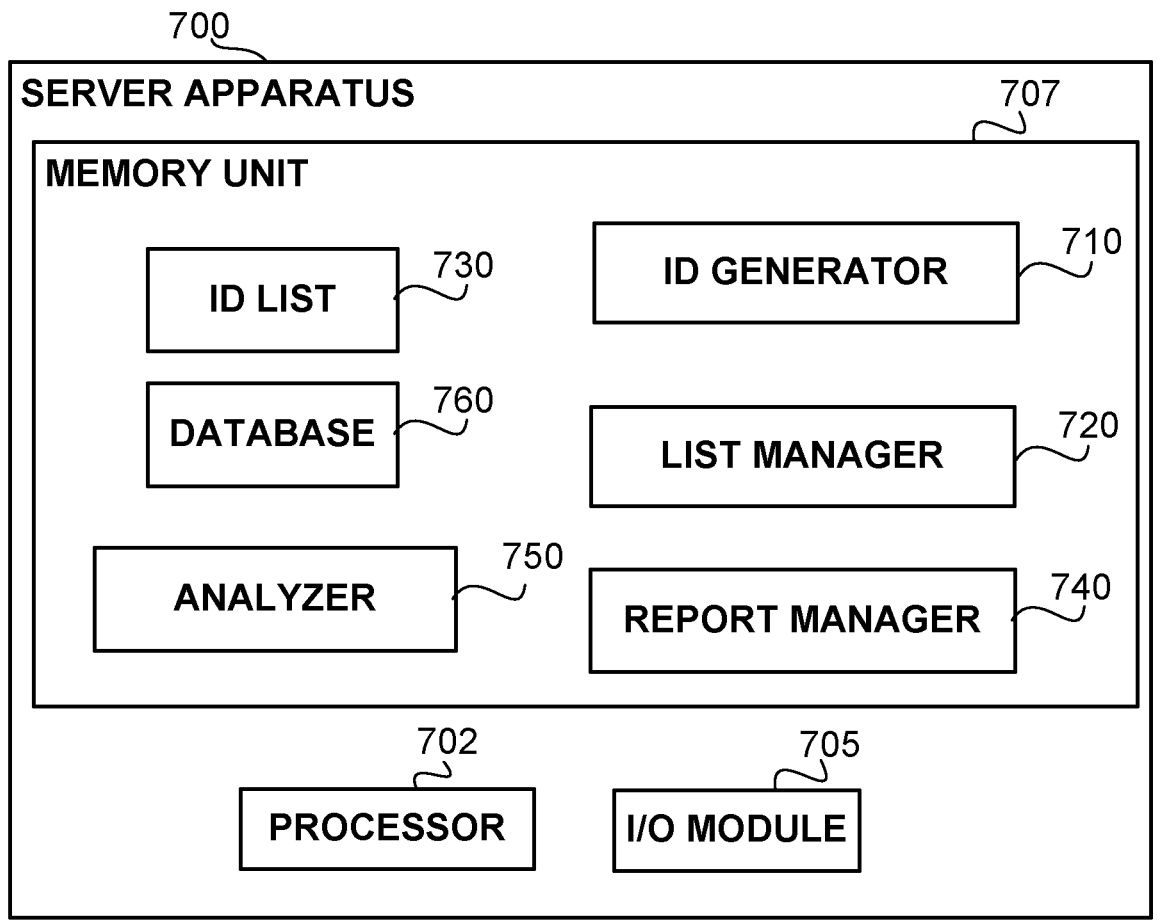
FIG. 7 illustrates a block diagram of a server apparatus, in accordance with some exemplary embodiments of the disclosed subject matter.

Referring now to FIG. 7 showing a block diagram of components of an apparatus of a server, in accordance with some exemplary embodiments of the disclosed subject matter.

In some exemplary embodiments, an Apparatus 700 of a server may comprise a Processor 702. Processor 702 may be a Central Processing Unit (CPU), a microprocessor, an electronic circuit, an Integrated Circuit (IC) or the like. Processor 702 may be utilized to perform computations required by Apparatus 700 or any of its subcomponents. Processor 702 may be configured to execute computer-programs useful in performing the method of FIG. 2, 3, 5, or the like.

In some exemplary embodiments of the disclosed subject matter, an Input/Output (I/O) Module 705 may be utilized to provide an output to and receive input from a user. I/O Module 705 may be used to transmit and receive information to and from the user or any other apparatus in communication therewith.

In some exemplary embodiments, Apparatus 700 may comprise a Memory Unit 707. Memory Unit 707 may be a short-term storage device or long-term storage device. Memory Unit 707 may be a persistent storage or volatile storage. Memory Unit 707 may be a disk drive, a Flash disk, a Random Access Memory (RAM), a memory chip, or the like. In some exemplary embodiments, Memory Unit 707 may retain program code operative to cause Processor 702 to perform acts associated with any of the subcomponents of Apparatus 700. In some exemplary embodiments, Memory Unit 707 may retain program code operative to cause Processor 702 to perform acts associated with any of the steps in FIG. 2, 3, 5, or the like.

In some exemplary embodiments, Apparatus 700 may comprise an Identifier (ID) List 730 of active temporary identifiers, or an accessing medium that can access Identifier List 730. In some exemplary embodiments, Identifier List 730 may indicate presently active temporary identifiers of clients, a reliability score of at least some of the clients, or the like. In some exemplary embodiments, Identifier List 730 may be modified when needed to include updated temporary identifiers of clients. Identifier List 730 may be updated by inserting the new temporary identifier thereto, and removing the old temporary identifier therefrom.

In some exemplary embodiments, Apparatus 700 may comprise a Database 760 of reports, or an accessing medium that can access Database 760. In some exemplary embodiments, Database 760 may be configured to store crowd-sensed information of clients. In some exemplary embodiments, each entry of Database 760 may include a report of sensitive information, an associated temporary identifier, an associated reliability score, or the like.

The components detailed below may be implemented as one or more sets of interrelated computer instructions, executed for example by Processor 702 or by another processor. The components may be arranged as one or more executable files, dynamic libraries, static libraries, methods, functions, services, or the like, programmed in any programming language and under any computing environment.

In some exemplary embodiments, Identifier Generator 710 may be configured generate a plurality of temporary identifiers for respective clients. In some exemplary embodiments, Identifier Generator 710 may generate a temporary identifier by generating a random 128 bit number, a random 64 bit number, selecting a free identifier from a list of unallocated identifiers, or the like, for each client. In some exemplary embodiments, Identifier Generator 710 may generate temporary identifiers to include strings, numbers, or values that are each long enough to prevent or reduce likelihood of any collision. In some exemplary embodiments, Identifier Generator 710 may generate temporary identifiers upon expiration of the temporary identifiers, upon receiving a client request, or the like.

In some cases, Apparatus 700 may exclude Identifier Generator 710, and temporary identifiers may be generated independently by clients.

In some exemplary embodiments, List Manager 720 may be configured to handle Identifier List 730 and to receive proposed temporary identifiers from Identifier Generator 710, from clients, e.g., via I/O Module 705, or the like. In some exemplary embodiments, List Manager 720 may determine whether to assign temporary identifiers to respective clients, based on identifying whether they are present in Identifier List 730. In some exemplary embodiments, List Manager 720 may verify requests, and identify whether they have a valid format, a valid value, a valid length, or the like. In some exemplary embodiments, upon identifying that they are valid, List Manager 720 may assign the temporary identifiers to respective clients by inserting them in Identifier List 730 and excluding from Identifier List 730 any previous identifier.

In some exemplary embodiments, List Manager 720 may be configured to keep, e.g., in a temporary manner, for each temporary identifier in Identifier List 730 a corresponding address of the client, e.g., which may be modified upon replacing the identifier.

In some exemplary embodiments, Report Manager 740 may be configured to handle any received reports of sensitive information, e.g., which may include or enable inference of non-sensitive information as well, from clients. In some exemplary embodiments, Report Manager 740 may receive a plurality of reports from a plurality of clients, e.g., via I/O Module 705 or via any other component or device, and retain the reports together with their associated temporary identifiers and scores in Database 760. In some exemplary embodiments, the scores of the temporary identifiers may be obtained from Identifier List 730 and retained at Database 760.

In some exemplary embodiments, Report Manager 740 may be configured to validate reports of sensitive information prior to retaining them in Database 760, e.g., to ensure that the sensitive information is provided during a valid timeframe, that the temporary identifiers are valid in Identifier List 730, that an address of a client matches the utilized temporary identifier, or the like.

In some exemplary embodiments, Analyzer 750 may be configured to analyze Database 760, e.g., based on uniting sensitive information from same temporary identifiers. In some exemplary embodiments, Analyzer 750 may perform real time analyses, offline analyses, or the like, of client reports, of contents of client reports, or the like. In some exemplary embodiments, based on the analyses, Analyzer 750 may identify indications of malicious activity, identify non-PII information in reports, create non-PII personalized profiles which may be used to identify malicious activity, determine reliability scores of temporary identifiers based on identified activity that may be malicious, or the like.

In some exemplary embodiments, Analyzer 750 may determine one or more advertising profiles, advertising parameters, traffic parameters, or the like, for each temporary identifier, without being able to uniquely identify the users from which the sensitive information is obtained. In some exemplary embodiments, Analyzer 750 may be configured to analyze Database 760 in any other manner or technique, to determine any other output.

In some cases, Analyzer 750 may be associated with one or more third party entities such as advertising parties that have access to one or more advertising platforms. In some cases, Analyzer 750 may be external to Apparatus 700 and receive access to Database 760, or Analyzer 750 may be internal to Apparatus 700.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   upon receiving a first report of sensitive information associated with a first temporary identifier, storing the first report with the first temporary identifier, wherein the first temporary identifier is utilized to temporarily identify a user device;
   after receiving the first report, communicating a message between the user device and the server, wherein the message comprises the first temporary identifier and a second temporary identifier of the user device;
   upon receiving from the user device a second report of sensitive information associated with the second temporary identifier, storing the second report with the second temporary identifier, whereby the first report cannot be directly matched with the second report based on respective identifiers thereof;
   wherein upon assigning the first temporary identifier to identify the first user device, adding the first temporary identifier to a list of active temporary identifiers, wherein said communicating the message comprises modifying the list of active temporary identifiers based on identifying that the second temporary identifier is not located in the list of active temporary identifiers of the server, wherein said modifying comprises adding the second temporary identifier to the list of active temporary identifiers and removing the first temporary identifier from the list of active temporary identifiers; and
   analyzing stored reports, wherein said analyzing comprises performing an analysis of user behavior based on retained reports, wherein the analysis of user behavior concludes a first user behavior associated with the first temporary identifier and a second user behavior associated with the second temporary identifier, whereby potentially determining different user behavior for a same user.

2. The method of claim 1, wherein the analysis of user behavior differentiates reports associated with the first temporary identifier from reports associated with the second temporary identifier in a same manner that the analysis of user behavior differentiates reports associated with the first temporary identifier from reports associated with a third temporary identifier, wherein the third temporary identifier is an identifier of a second user device different than the user device.

3. The method of claim 1 further comprising tracking malicious activity by:
   determining that the first temporary identifier is associated with malicious activity based on reports associated with the first temporary identifier, and
   marking the first temporary identifier as malicious,
   wherein said modifying the list of active temporary identifiers comprises marking the second temporary identifier as malicious.

4. The method of claim 1, wherein said modifying the list of active temporary identifiers is performed periodically, or upon reaching a maximal threshold of requests to replace temporary identifiers.

5. The method of claim 1, wherein the first temporary identifier is determined to be associated with malicious activity based on at least one of:
   contradictory information in reports associated with the first temporary identifier;
   an abnormal quantity of reports associated with the first temporary identifier within a timeframe; and
   an inconsistency of reports associated with the first temporary identifier.

6. A method comprising:
   upon receiving a first report of sensitive information associated with a first temporary identifier, storing the first report with the first temporary identifier, wherein the first temporary identifier is utilized to temporarily identify a user device;
   after receiving the first report, communicating a message between the user device and the server, wherein the message comprises the first temporary identifier and a second temporary identifier of the user device;
   upon receiving from the user device a second report of sensitive information associated with the second temporary identifier, storing the second report with the second temporary identifier, whereby the first report cannot be directly matched with the second report based on respective identifiers thereof
   analyzing stored reports, wherein said analyzing comprises performing an analysis of user behavior based on retained reports, wherein the analysis of user behavior concludes a first user behavior associated with the first temporary identifier and a second user behavior associated with the second temporary identifier, whereby potentially determining different user behavior for a same user; and
   wherein the analysis of user behavior comprises a reliability analysis, wherein the reliability analysis is configured to determine a reliability score for the first temporary identifier based on reports associated with the first temporary identifier, wherein in response to determining that a reliability score of the first temporary identifier is below a threshold, marking the first temporary identifier with an unreliability indication in the list of active temporary identifiers.

7. The method of claim 6 further comprising assigning to each report associated with the first temporary identifier the unreliability indication, wherein said assigning is performed prior to said communicating the message between the user device and the server.

8. A method comprising:
upon receiving a first report of sensitive information associated with a first temporary identifier, storing the first report with the first temporary identifier, wherein the first temporary identifier is utilized to temporarily identify a user device;
after receiving the first report, communicating a message between the user device and the server, wherein the message comprises the first temporary identifier and a second temporary identifier of the user device;
upon receiving from the user device a second report of sensitive information associated with the second temporary identifier, storing the second report with the second temporary identifier, whereby the first report cannot be directly matched with the second report based on respective identifiers thereof
analyzing stored reports, wherein said analyzing comprises performing an analysis of user behavior based on retained reports, wherein the analysis of user behavior concludes a first user behavior associated with the first temporary identifier and a second user behavior associated with the second temporary identifier, whereby potentially determining different user behavior for a same user; and
receiving a plurality of messages from a respective plurality of user devices, wherein each message of the plurality of messages comprises a request to change a temporary identifier of the respective user device, wherein the method comprises inserting the plurality of messages in a queue and processing them at an end of a defined period.

9. A computer program product comprising a non-transitory computer readable storage medium retaining program instructions, which program instructions when read by a processor, cause the processor to perform:
upon receiving a first report of sensitive information associated with a first temporary identifier, storing the first report with the first temporary identifier, wherein the first temporary identifier is utilized to temporarily identify a user device;
after receiving the first report, communicating a message between the user device and the server, wherein the message comprises the first temporary identifier and a second temporary identifier of the user device;
upon receiving from the user device a second report of sensitive information associated with the second temporary identifier, storing the second report with the second temporary identifier, whereby the first report cannot be directly matched with the second report based on respective identifiers thereof;
wherein upon assigning the first temporary identifier to identify the first user device, adding the first temporary identifier to a list of active temporary identifiers, wherein said communicating the message comprises modifying the list of active temporary identifiers based on identifying that the second temporary identifier is not located in the list of active temporary identifiers of the server, wherein said modifying comprises adding the second temporary identifier to the list of active temporary identifiers and removing the first temporary identifier from the list of active temporary identifiers; and
analyzing stored reports, wherein said analyzing comprises performing an analysis of user behavior based on retained reports, wherein the analysis of user behavior concludes a first user behavior associated with the first temporary identifier and a second user behavior associated with the second temporary identifier, whereby potentially determining different user behavior for a same user.

10. The computer program product of claim 9, wherein the analysis of user behavior differentiates reports associated with the first temporary identifier from reports associated with the second temporary identifier in a same manner that the analysis of user behavior differentiates reports associated with the first temporary identifier from reports associated with a third temporary identifier, wherein the third temporary identifier is an identifier of a second user device different than the user device.

11. The computer program product of claim 9, wherein the instructions, when read by the processor, cause the processor to track malicious activity by:
determining that the first temporary identifier is associated with malicious activity based on reports associated with the first temporary identifier, and
marking the first temporary identifier as malicious,
wherein said modifying the list of active temporary identifiers comprises marking the second temporary identifier as malicious.

12. The computer program product of claim 9, wherein said modifying the list of active temporary identifiers is performed periodically, or upon reaching a maximal threshold of requests to replace temporary identifiers.

13. The computer program product of claim 9, wherein the first temporary identifier is determined to be associated with malicious activity based on at least one of:
contradictory information in reports associated with the first temporary identifier;
an abnormal quantity of reports associated with the first temporary identifier within a timeframe; and
an inconsistency of reports associated with the first temporary identifier.

14. A computer program product comprising a non-transitory computer readable storage medium retaining program instructions, which program instructions when read by a processor, cause the processor to perform:
upon receiving a first report of sensitive information associated with a first temporary identifier, storing the first report with the first temporary identifier, wherein the first temporary identifier is utilized to temporarily identify a user device;
after receiving the first report, communicating a message between the user device and the server, wherein the message comprises the first temporary identifier and a second temporary identifier of the user device;
upon receiving from the user device a second report of sensitive information associated with the second temporary identifier, storing the second report with the second temporary identifier, whereby the first report cannot be directly matched with the second report based on respective identifiers thereof
analyzing stored reports, wherein said analyzing comprises performing an analysis of user behavior based on retained reports, wherein the analysis of user behavior concludes a first user behavior associated with the first temporary identifier and a second user behavior associated with the second temporary identifier, whereby potentially determining different user behavior for a same user; and wherein the analysis of user behavior comprises a reliability analysis, wherein the reliability analysis is configured to determine a reliability score for the first temporary identifier based on reports associated with the first temporary identifier, wherein in response to determining that a reliability score of the first temporary identifier is below a threshold, marking the first temporary identifier with an unreliability indication in the list of active temporary identifiers.

15. The computer program product of claim 14, wherein the instructions, when read by the processor, cause the processor to assign to each report associated with the first temporary identifier the unreliability indication, wherein said assigning is performed prior to said communicating the message between the user device and the server.

16. A computer program product comprising a non-transitory computer readable storage medium retaining program instructions, which program instructions when read by a processor, cause the processor to perform:
  upon receiving a first report of sensitive information associated with a first temporary identifier, storing the first report with the first temporary identifier, wherein the first temporary identifier is utilized to temporarily identify a user device;
  after receiving the first report, communicating a message between the user device and the server, wherein the message comprises the first temporary identifier and a second temporary identifier of the user device;
  upon receiving from the user device a second report of sensitive information associated with the second temporary identifier, storing the second report with the second temporary identifier, whereby the first report cannot be directly matched with the second report based on respective identifiers thereof
  analyzing stored reports, wherein said analyzing comprises performing an analysis of user behavior based on retained reports, wherein the analysis of user behavior concludes a first user behavior associated with the first temporary identifier and a second user behavior associated with the second temporary identifier, whereby potentially determining different user behavior for a same user; and
  wherein the instructions, when read by the processor, cause the processor to receive a plurality of messages from a respective plurality of user devices, wherein each message of the plurality of messages comprises a request to change a temporary identifier of the respective user device, wherein the instructions, when read by the processor, cause the processor to insert the plurality of messages in a queue and process them at an end of a defined period.

17. A system comprising:
  a server coupled to a database, wherein the database retaining reports of sensitive information, wherein each report is associated with an identifier of a source of the report;
  a plurality of user devices configured to transmit reports of sensitive information to the server, wherein each user device of the plurality of user devices is uniquely identified at each point in time using a temporary identifier, wherein each user device of the plurality of user devices is identified by at least two different temporary identifiers at two different timeframes; and
  wherein the system is configured to preserve privacy of users of the plurality of user devices by preventing ability to group all sensitive information of a user device over time, while enabling grouping of reports originating from the same user device over time;
  wherein said server is configured to retain a list of active temporary identifiers, wherein said server is configured to enable a replacement of a first temporary identifier of a user device by a second temporary identifier, wherein said server is configured to avoid retaining information connecting between the first temporary identifier and the second temporary identifier, whereby preventing ability to group sensitive information associated with the first temporary identifier with sensitive information associated with the second temporary identifier.

18. A system comprising:
  a server coupled to a database, wherein the database retaining reports of sensitive information, wherein each report is associated with an identifier of a source of the report;
  a plurality of user devices configured to transmit reports of sensitive information to the server, wherein each user device of the plurality of user devices is uniquely identified at each point in time using a temporary identifier, wherein each user device of the plurality of user devices is identified by at least two different temporary identifiers at two different timeframes; and
  wherein the system is configured to preserve privacy of users of the plurality of user devices by preventing ability to group all sensitive information of a user device over time, while enabling grouping of reports originating from the same user device over time;
  wherein said server is configured to retain a list of active temporary identifiers, wherein said server is configured to enable a replacement of a first temporary identifier of a user device by a second temporary identifier, wherein said server is configured to avoid retaining information connecting between the first temporary identifier and the second temporary identifier, whereby preventing ability to group sensitive information associated with the first temporary identifier with sensitive information associated with the second temporary identifier;
  wherein each temporary identifier in the list of active temporary identifiers is matched with a permanent identifier of the user device, wherein the server is configured to avoid retaining permanent identifiers matching temporary identifiers that are excluded from the list of active temporary identifiers, whereby preventing analysis of a history of a specific user based on a permanent identifier thereof.

19. The system of claim 17, wherein said server is configured to determine a score of each user device based on reports received therefrom and associated with a same temporary identifier.

20. The system of claim 17, wherein upon replacing a first temporary identifier by a second temporary identifier, assigning a score of the first temporary identifier to be a score of the second temporary identifier.

* * * * *